US012621796B2

(12) United States Patent
Chetlur Ravi et al.

(10) Patent No.: US 12,621,796 B2
(45) Date of Patent: May 5, 2026

(54) EARLY INDICATION OF A MESSAGE TYPE FOR UNMANNED AERIAL VEHICLES

(71) Applicant: QUALCOMM Incorporated, San Diego, CA (US)

(72) Inventors: Vishnu Vardhan Chetlur Ravi, San Diego, CA (US); Le Liu, San Jose, CA (US); Stefano Faccin, San Ysidro, CA (US); Umesh Phuyal, San Diego, CA (US); Alberto Rico Alvarino, San Diego, CA (US); Hong Cheng, Basking Ridge, NJ (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 18/171,229

(22) Filed: Feb. 17, 2023

(65) Prior Publication Data

US 2024/0284399 A1     Aug. 22, 2024

(51) Int. Cl.
　　*H04W 68/00*　　　(2009.01)
　　*H04B 7/185*　　　(2006.01)
(52) U.S. Cl.
　　CPC ...... *H04W 68/005* (2013.01); *H04B 7/18504* (2013.01)
(58) Field of Classification Search
　　CPC ... H04W 68/005; H04W 72/02; H04W 16/14; H04W 72/231; H04B 7/18504
　　See application file for complete search history.

(56) References Cited

U.S. PATENT DOCUMENTS

| | | | |
|---|---|---|---|
| 11,019,042 B1 * | 5/2021 | Chang | H04L 63/045 |
| 2005/0240625 A1 * | 10/2005 | Chang | G06Q 10/08 |
| 2016/0012393 A1 * | 1/2016 | Wang | G06Q 10/08355 |
| | | | 705/338 |
| 2019/0155312 A1 * | 5/2019 | Tam | G05D 1/0022 |
| 2019/0174303 A1 * | 6/2019 | Zhou | H04L 9/0822 |
| 2019/0177002 A1 * | 6/2019 | Enke | B64U 10/13 |
| 2021/0344410 A1 * | 11/2021 | Ge | H04B 7/18506 |
| 2022/0095100 A1 * | 3/2022 | Sasi | H04W 12/08 |
| 2022/0141867 A1 * | 5/2022 | Dong | H04W 72/569 |
| | | | 370/329 |
| 2024/0089994 A1 * | 3/2024 | Park | H04W 72/25 |
| 2024/0201696 A1 * | 6/2024 | Mooney | G05D 1/633 |
| 2025/0142602 A1 * | 5/2025 | Han | H04W 72/51 |

* cited by examiner

*Primary Examiner* — Christine Ng
(74) *Attorney, Agent, or Firm* — QUALCOMM Incorporated

(57) ABSTRACT

Methods, systems, and devices for wireless communication are described. An aerial vehicle (a transmitting device) may transmit control information that indicates a message type of a message. The message type may be one of multiple aerial vehicle broadcast message types, such as an aerial vehicle-to-aerial vehicle message type or an aerial vehicle-to-terrestrial user equipment (UE) message type. The transmitting device may transmit the message to a receiving device (e.g., another aerial vehicle or a terrestrial UE) in accordance with the indicated message type. For example, the transmitting device may transmit an aerial vehicle-to-aerial vehicle message to another nearby aerial vehicle or an aerial vehicle-to-terrestrial UE message to a terrestrial UE. As such, a receiving device may be aware of a message type and determine whether to decode the message accordingly.

28 Claims, 17 Drawing Sheets

Transmit control information that indicates a message type of a message, where the message type indicated by the control information is one of a set of multiple aerial vehicle broadcast message types　1205

Transmit the message in accordance with the indicated message type　1210

1200

Receiver

Communications Manager

Transmitter

410

420

415

405

400

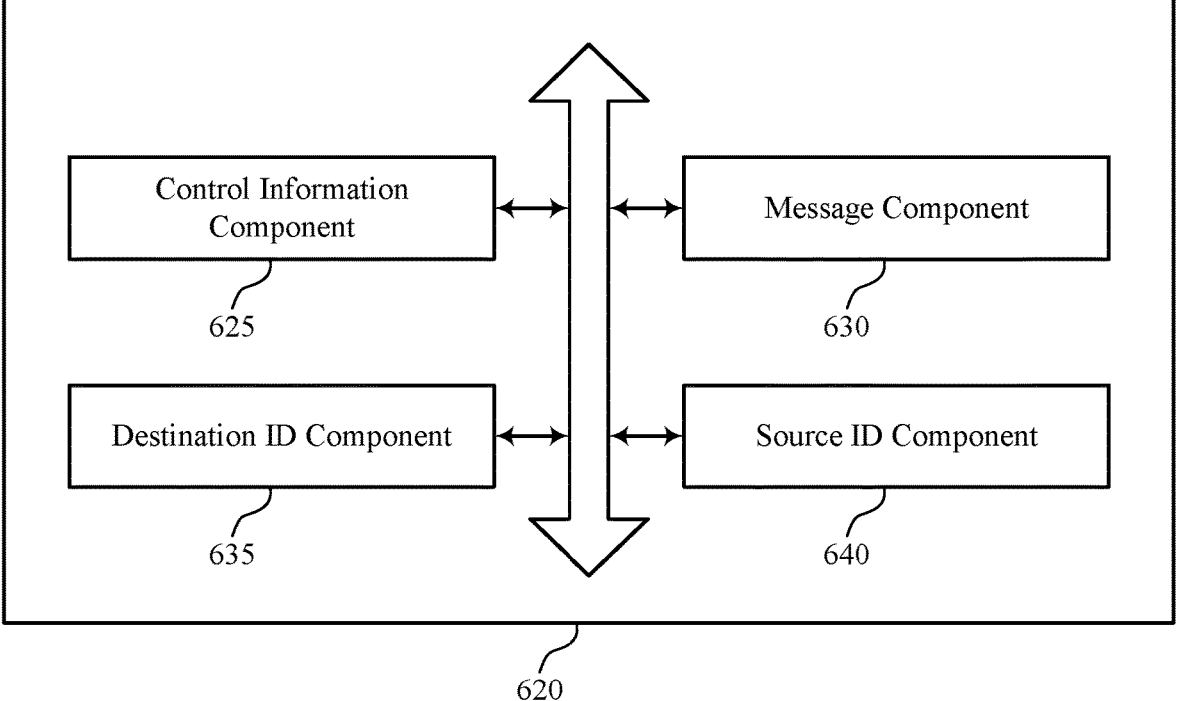
625
630
635
640
620
600
FIG. 6

130

105

115

Network
Entity

Transceiver

1110

Antenna

1115

Communications
Manager

1120

Memory

Code

1130

1125

1140

Processor

1135

1105

1100

Transmit control information that indicates a message type of a message, where the message type indicated by the control information is one of a set of multiple aerial vehicle broadcast message types

1205

Transmit the message in accordance with the indicated message type

1210

1200

Figure 13:
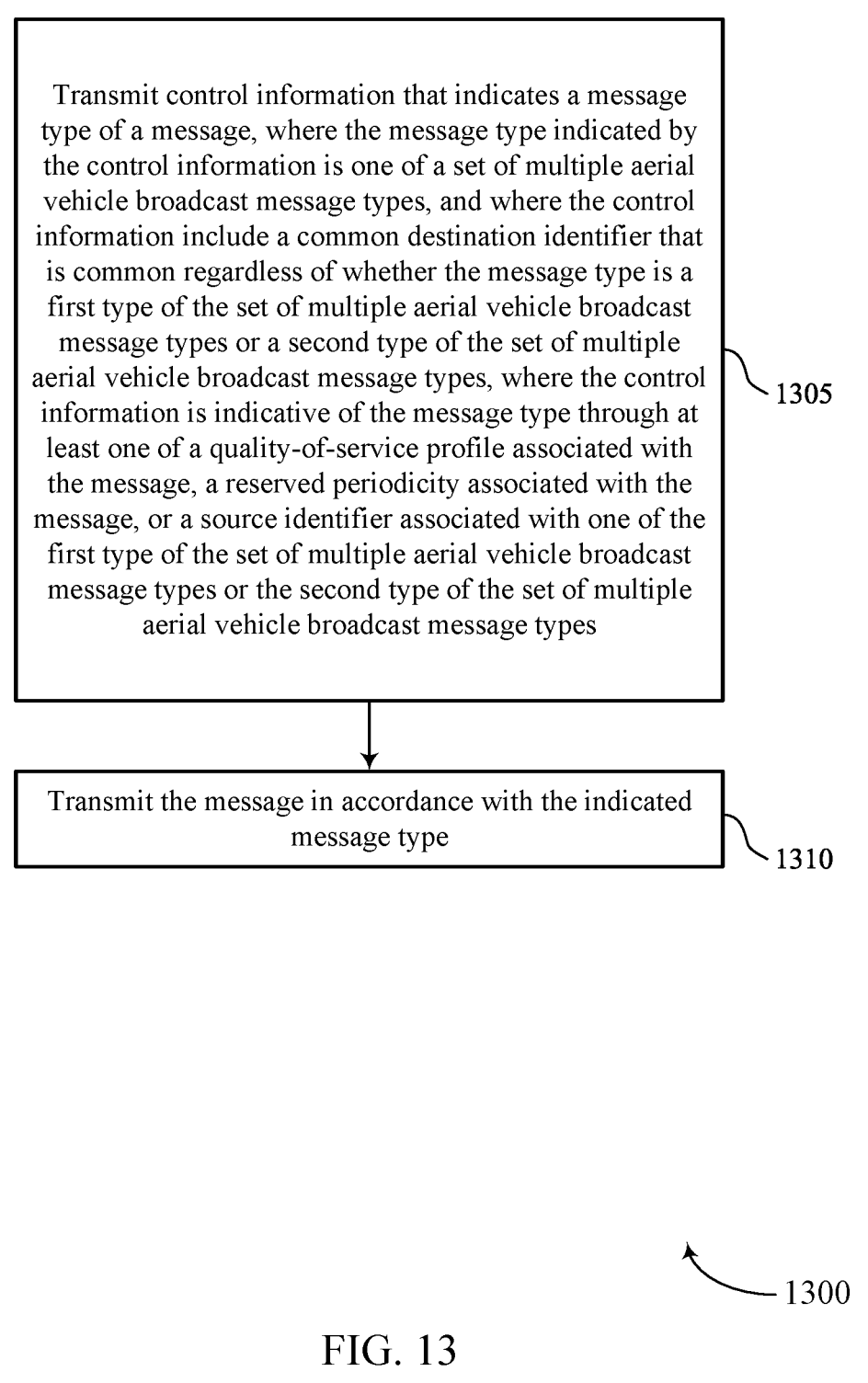

Transmit control information that indicates a message type of a message, where the message type indicated by the control information is one of a set of multiple aerial vehicle broadcast message types, and where the control information include a common destination identifier that is common regardless of whether the message type is a first type of the set of multiple aerial vehicle broadcast message types or a second type of the set of multiple aerial vehicle broadcast message types, where the control information is indicative of the message type through at least one of a quality-of-service profile associated with the message, a reserved periodicity associated with the message, or a source identifier associated with one of the first type of the set of multiple aerial vehicle broadcast message types or the second type of the set of multiple aerial vehicle broadcast message types

1305

Transmit the message in accordance with the indicated message type

Figure 14:
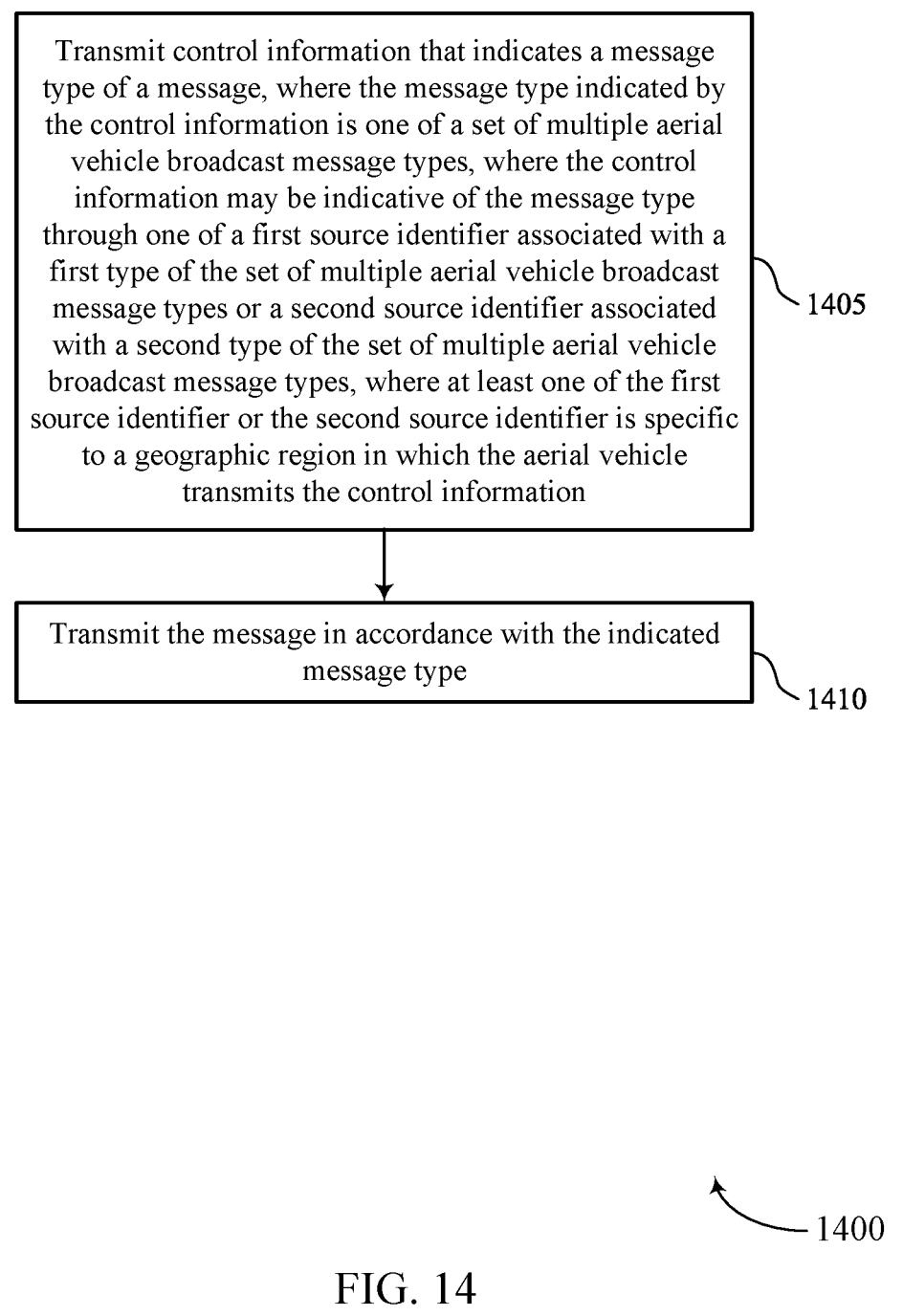

Transmit control information that indicates a message type of a message, where the message type indicated by the control information is one of a set of multiple aerial vehicle broadcast message types, where the control information may be indicative of the message type through one of a first source identifier associated with a first type of the set of multiple aerial vehicle broadcast message types or a second source identifier associated with a second type of the set of multiple aerial vehicle broadcast message types, where at least one of the first source identifier or the second source identifier is specific to a geographic region in which the aerial vehicle transmits the control information

1405

Transmit the message in accordance with the indicated message type

Receive control information that indicates a message type of a message, where the message type indicated by the control information is one of a set of multiple aerial vehicle broadcast message types

1505

Receive the message in accordance with the indicated message type

1510

1500

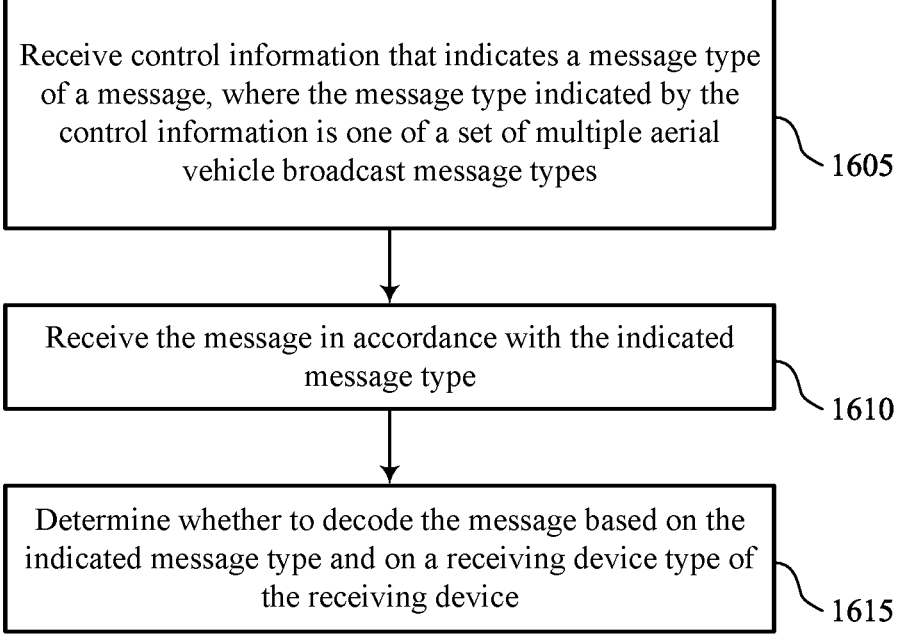

Receive control information that indicates a message type of a message, where the message type indicated by the control information is one of a set of multiple aerial vehicle broadcast message types

1605

Receive the message in accordance with the indicated message type

1610

Determine whether to decode the message based on the indicated message type and on a receiving device type of the receiving device

Figure 17:
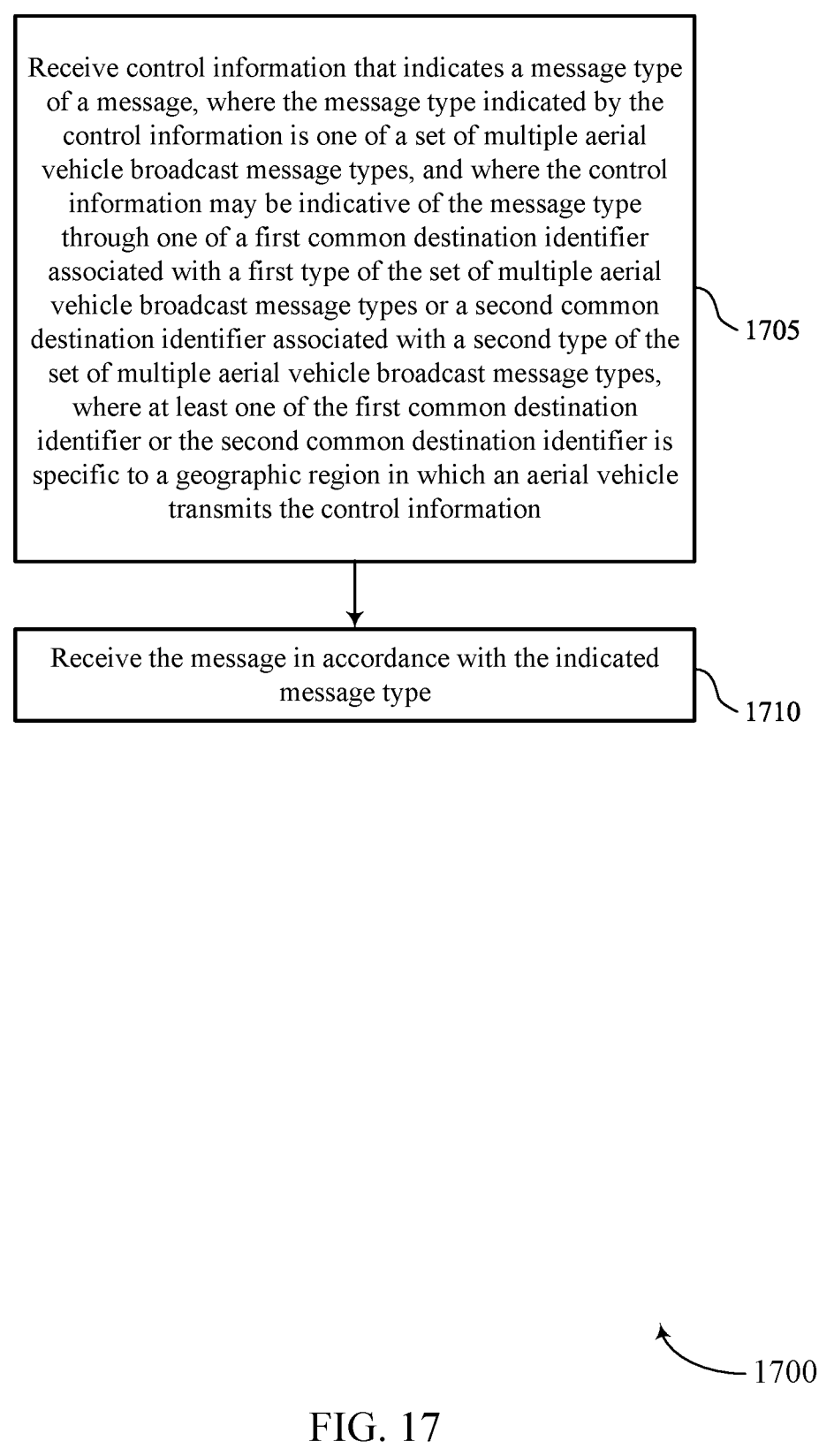

Receive control information that indicates a message type of a message, where the message type indicated by the control information is one of a set of multiple aerial vehicle broadcast message types, and where the control information may be indicative of the message type through one of a first common destination identifier associated with a first type of the set of multiple aerial vehicle broadcast message types or a second common destination identifier associated with a second type of the set of multiple aerial vehicle broadcast message types, where at least one of the first common destination identifier or the second common destination identifier is specific to a geographic region in which an aerial vehicle transmits the control information

1705

Receive the message in accordance with the indicated message type

EARLY INDICATION OF A MESSAGE TYPE FOR UNMANNED AERIAL VEHICLES

FIELD OF TECHNOLOGY

The following relates to wireless communication, including early indication of a message type for unmanned aerial vehicles (UAVs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A wireless communications system may support communications between terrestrial wireless devices (e.g., UEs, network entities) and unmanned aerial vehicles (UAVs). Such devices may perform different types of communications intended for various receivers. For example, a UAV may transmit different messages intended for terrestrial devices or other UAVs. However, receiving devices may be unaware of which messages from the UAV are intended for them, and as such, may use excessive power and resources to decode the messages, only to discover that the messages were not intended for the receiving devices.

SUMMARY

The described techniques relate to improved methods, systems, devices, and apparatuses that support early indication of a message type for unmanned aerial vehicles (UAVs). For example, the described techniques provide for a UAV (e.g., a transmitting device) to transmit control information that indicates a message type of a message, such as a physical sidelink shared channel (PSSCH) message. The message type may be one of multiple UAV broadcast message types, including UAV-to-UAV messages or UAV-to-terrestrial user equipment (UE) messages. For example, a UAV-to-UAV message may include a type of detect and avoid (DAA) message and a UAV-to-terrestrial UE message may include a broadcast remote identifier (BRID) message. Other types of messages may be broadcast, and there may even be various types of DAA or BRID messages. The UAV may transmit the message (e.g., a PSSCH message) to a receiving device (another UAV or a terrestrial UE) in accordance with the indicated message type. For example, the UAV may transmit a first type of UAV broadcast message to a second UAV and a second type of UAV broadcast message to a terrestrial UE. In this way, because of the early indication in the control information, a receiving device may be aware of the message type and determine whether to decode the corresponding message based on the indicated message type and a type of the receiving device.

A method for wireless communication at a transmitting device of an aerial vehicle is described. The method may include transmitting control information that indicates a message type of a sidelink shared channel message, where the message type indicated by the control information is one of a set of multiple aerial vehicle broadcast message types and transmitting the sidelink shared channel message in accordance with the indicated message type.

An apparatus for wireless communication at a transmitting device of an aerial vehicle is described. The apparatus may include a processor, memory coupled with the processor, and instructions stored in the memory. The instructions may be executable by the processor to cause the apparatus to transmit control information that indicates a message type of a sidelink shared channel message, where the message type indicated by the control information is one of a set of multiple aerial vehicle broadcast message types and transmit the sidelink shared channel message in accordance with the indicated message type.

Another apparatus for wireless communication at a transmitting device of an aerial vehicle is described. The apparatus may include means for transmitting control information that indicates a message type of a sidelink shared channel message, where the message type indicated by the control information is one of a set of multiple aerial vehicle broadcast message types and means for transmitting the sidelink shared channel message in accordance with the indicated message type.

A non-transitory computer-readable medium storing code for wireless communication at a transmitting device of an aerial vehicle is described. The code may include instructions executable by a processor to transmit control information that indicates a message type of a sidelink shared channel message, where the message type indicated by the control information is one of a set of multiple aerial vehicle broadcast message types and transmit the sidelink shared channel message in accordance with the indicated message type.

In some examples of the method, apparatuses, and non-transitory computer-readable medium described herein, the control information includes a common destination ID that may be common regardless of whether the message type may be a first type of the set of multiple aerial vehicle broadcast message types or a second type of the set of multiple aerial vehicle broadcast message types, where the control information may be indicative of the message type through at least one of a quality-of-service profile associated with the sidelink shared channel message, a reserved periodicity associated with the sidelink shared channel message, or a source ID associated with one of the first type of the set of multiple aerial vehicle broadcast message types or the second type of the set of multiple aerial vehicle broadcast message types.

In some examples of the method, apparatuses, and non-transitory computer-readable medium described herein, the control information includes a common destination ID that may be common regardless of whether the message type may be a first type of the set of multiple aerial vehicle broadcast message types or a second type of the set of multiple aerial vehicle broadcast message types, where the control information may be indicative of the message type through a set of priority bits associated with the sidelink shared channel message.

In some examples of the method, apparatuses, and non-transitory computer-readable medium described herein, the control information includes a common destination ID that may be common regardless of whether the message type may be a first type of the set of multiple aerial vehicle broadcast message types or a second type of the set of multiple aerial vehicle broadcast message types, where the control information may be indicative of the message type through a resource reservation period associated with a periodicity of the sidelink shared channel message.

In some examples of the method, apparatuses, and non-transitory computer-readable medium described herein, the control information may be indicative of the message type through one of a first common destination ID associated with a first type of the set of multiple aerial vehicle broadcast message types or a second common destination ID associated with a second type of the set of multiple aerial vehicle broadcast message types, where at least one of the first common destination ID or the second common destination ID may be specific to a geographic region in which the aerial vehicle transmits the control information.

In some examples of the method, apparatuses, and non-transitory computer-readable medium described herein, the control information includes a source-layer ID in addition to one of the first common destination ID or the second common destination ID.

In some examples of the method, apparatuses, and non-transitory computer-readable medium described herein, the control information may be indicative of the message type through one of a first source ID associated with a first type of the set of multiple aerial vehicle broadcast message types or a second source ID associated with a second type of the set of multiple aerial vehicle broadcast message types, where at least one of the first source ID or the second source ID may be specific to a geographic region in which the aerial vehicle transmits the control information.

In some examples of the method, apparatuses, and non-transitory computer-readable medium described herein, the control information may be indicative of the message type through a source ID, where the source ID includes a first portion that may be in sidelink control information and a second portion that may be in a medium access control subheader.

In some examples of the method, apparatuses, and non-transitory computer-readable medium described herein, both the first portion of the source ID and the second portion of the source ID may be indicative of the message type.

In some examples of the method, apparatuses, and non-transitory computer-readable medium described herein, the first portion of the source ID may be indicative of the message type, and where the second portion of the source ID may be not indicative of the message type.

In some examples of the method, apparatuses, and non-transitory computer-readable medium described herein, the second portion of the source ID may be indicative of the message type, and where the first portion of the source ID may be not indicative of the message type.

In some examples of the method, apparatuses, and non-transitory computer-readable medium described herein, at least one of the first portion of the source ID or the second portion of the source ID indicates a BRID.

In some examples of the method, apparatuses, and non-transitory computer-readable medium described herein, the control information includes a signaling bit that indicates whether a source ID included in the control information may be indicative of the message type.

In some examples of the method, apparatuses, and non-transitory computer-readable medium described herein, the control information may be indicative of the message type through a source ID which may be provided to an aerial device by a network.

In some examples of the method, apparatuses, and non-transitory computer-readable medium described herein, the control information may be indicative of the message type through a logical channel ID.

In some examples of the method, apparatuses, and non-transitory computer-readable medium described herein, the set of multiple aerial vehicle broadcast message types includes an aerial vehicle-to-aerial vehicle communications type or an aerial vehicle-to-terrestrial communications type.

In some examples of the method, apparatuses, and non-transitory computer-readable medium described herein, the aerial vehicle-to-aerial vehicle communications type may be associated with one or more types of a DAA message and the aerial vehicle-to-terrestrial communications type may be associated with a BRID message.

A method for wireless communication at a receiving device is described. The method may include receiving control information that indicates a message type of a sidelink shared channel message, where the message type indicated by the control information is one of a set of multiple aerial vehicle broadcast message types and receiving the sidelink shared channel message in accordance with the indicated message type.

An apparatus for wireless communication at a receiving device is described. The apparatus may include a processor, memory coupled with the processor, and instructions stored in the memory. The instructions may be executable by the processor to cause the apparatus to receive control information that indicates a message type of a sidelink shared channel message, where the message type indicated by the control information is one of a set of multiple aerial vehicle broadcast message types and receive the sidelink shared channel message in accordance with the indicated message type.

Another apparatus for wireless communication at a receiving device is described. The apparatus may include means for receiving control information that indicates a message type of a sidelink shared channel message, where the message type indicated by the control information is one of a set of multiple aerial vehicle broadcast message types and means for receiving the sidelink shared channel message in accordance with the indicated message type.

A non-transitory computer-readable medium storing code for wireless communication at a receiving device is described. The code may include instructions executable by a processor to receive control information that indicates a message type of a sidelink shared channel message, where the message type indicated by the control information is one of a set of multiple aerial vehicle broadcast message types and receive the sidelink shared channel message in accordance with the indicated message type.

Some examples of the method, apparatuses, and non-transitory computer-readable medium described herein may further include operations, features, means, or instructions for determining whether to decode the sidelink shared channel message based on the indicated message type and on a receiving device type of the receiving device.

In some examples of the method, apparatuses, and non-transitory computer-readable medium described herein, the control information includes a common destination ID that may be common regardless of whether the message type may be a first type of the set of multiple aerial vehicle broadcast message types or a second type of the set of multiple aerial vehicle broadcast message types, where the control information may be indicative of the message type through at least one of a quality-of-service profile associated with the sidelink shared channel message, a reserved periodicity associated with the sidelink shared channel message, or a source ID associated with one of the first type of the set of multiple aerial vehicle broadcast message types or the second type of the set of multiple aerial vehicle broadcast message types.

In some examples of the method, apparatuses, and non-transitory computer-readable medium described herein, the control information includes a common destination ID that may be common regardless of whether the message type may be a first type of the set of multiple aerial vehicle broadcast message types or a second type of the set of multiple aerial vehicle broadcast message types, where the control information may be indicative of the message type through a set of priority bits associated with the sidelink shared channel message.

In some examples of the method, apparatuses, and non-transitory computer-readable medium described herein, the control information includes a common destination ID that may be common regardless of whether the message type may be a first type of the set of multiple aerial vehicle broadcast message types or a second type of the set of multiple aerial vehicle broadcast message types, where the control information may be indicative of the message type through a resource reservation period associated with a periodicity of the sidelink shared channel message.

In some examples of the method, apparatuses, and non-transitory computer-readable medium described herein, the control information may be indicative of the message type through one of a first common destination ID associated with a first type of the set of multiple aerial vehicle broadcast message types or a second common destination ID associated with a second type of the set of multiple aerial vehicle broadcast message types, where at least one of the first common destination ID or the second common destination ID may be specific to a geographic region in which an aerial vehicle transmits the control information.

In some examples of the method, apparatuses, and non-transitory computer-readable medium described herein, the control information includes a source-layer ID in addition to one of the first common destination ID or the second common destination ID.

In some examples of the method, apparatuses, and non-transitory computer-readable medium described herein, the control information may be indicative of the message type through one of a first source ID associated with a first type of the set of multiple aerial vehicle broadcast message types or a second source ID associated with a second type of the set of multiple aerial vehicle broadcast message types, where at least one of the first source ID or the second source ID may be specific to a geographic region in which an aerial vehicle transmits the control information.

In some examples of the method, apparatuses, and non-transitory computer-readable medium described herein, the control information may be indicative of the message type through a source ID, where the source ID includes a first portion that may be in sidelink control information and a second portion that may be in a medium access control subheader.

In some examples of the method, apparatuses, and non-transitory computer-readable medium described herein, both the first portion of the source ID and the second portion of the source ID may be indicative of the message type.

In some examples of the method, apparatuses, and non-transitory computer-readable medium described herein, the first portion of the source ID may be indicative of the message type, and where the second portion of the source ID may be not indicative of the message type.

In some examples of the method, apparatuses, and non-transitory computer-readable medium described herein, the second portion of the source ID may be indicative of the message type, and where the first portion of the source ID may be not indicative of the message type.

In some examples of the method, apparatuses, and non-transitory computer-readable medium described herein, at least one of the first portion of the source ID or the second portion of the source ID indicates a BRID.

In some examples of the method, apparatuses, and non-transitory computer-readable medium described herein, the control information includes a signaling bit that indicates whether a source ID included in the control information may be indicative of the message type.

In some examples of the method, apparatuses, and non-transitory computer-readable medium described herein, the control information may be indicative of the message type through a source ID which may be provided to an aerial device by a network.

In some examples of the method, apparatuses, and non-transitory computer-readable medium described herein, the control information may be indicative of the message type through a logical channel ID.

In some examples of the method, apparatuses, and non-transitory computer-readable medium described herein, the set of multiple aerial vehicle broadcast message types includes an aerial vehicle-to-aerial vehicle communications type or an aerial vehicle-to-terrestrial communications type.

In some examples of the method, apparatuses, and non-transitory computer-readable medium described herein, the aerial vehicle-to-aerial vehicle communications type may be associated with one or more types of a DAA message and the aerial vehicle-to-terrestrial communications type may be associated with a BRID message.

BRIEF DESCRIPTION OF THE DRAWINGS

FIG. 6 illustrates a block diagram of a communications manager that supports early indication of a message type for UAVs in accordance with one or more aspects of the present disclosure.

FIGS. 12 through 17 illustrate flowcharts showing methods that support early indication of a message type for UAVs in accordance with one or more aspects of the present disclosure.

DETAILED DESCRIPTION

Figure 1:
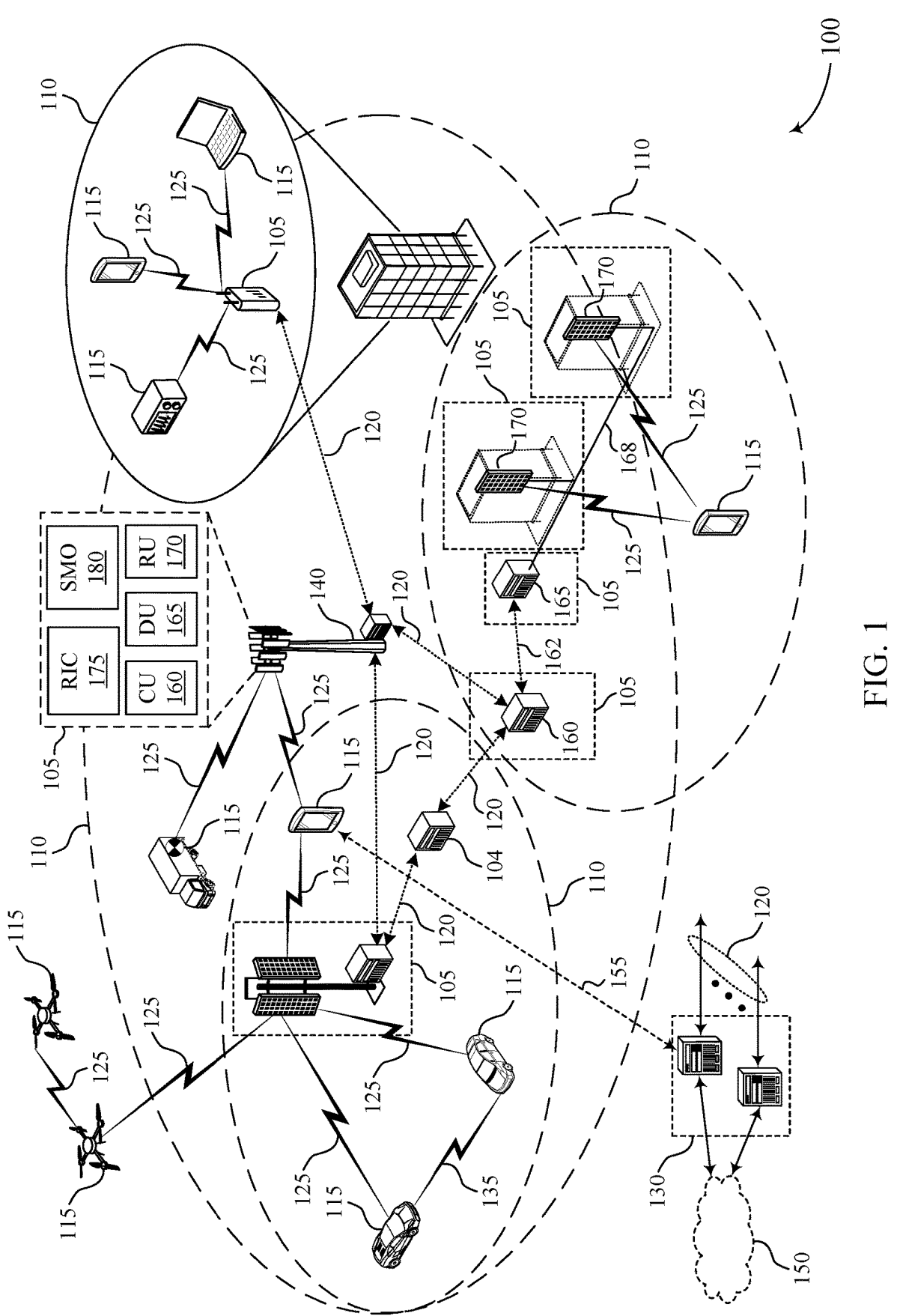
FIG. 1 illustrates an example of a wireless communications system that supports early indication of a message type for unmanned aerial vehicles (UAVs) in accordance with one or more aspects of the present disclosure.

A wireless communications system may support communications between terrestrial wireless devices (e.g., user equipments (UEs), network entities) and aerial vehicles such as unmanned aerial vehicles (UAVs) or other unmanned aerial systems (UASs). For example, the wireless communications system may support UAV-to-UAV communications and UAV-to-terrestrial UE communications. Some types of UAV-to-UAV communications may include detect and avoid (DAA) messages, intended to assist UAVs in avoiding collisions with each other. Such DAA messages may be similar to safety messages used in vehicle-to-everything (V2X) communications as the UAVs may broadcast information about their position, headings, and other location information. Some types of UAV-to-terrestrial UE communications may include broadcast remote identifier (BRID) messages that also indicate information regarding the position and heading of a UAV and flight information for remote identification. In some examples, the terrestrial UE may be associated with a user (e.g., a law enforcement agent) on the ground.

In this way, the UAV-to-UAV and UAV-to-terrestrial UE communications types may be intended for specific receivers. For example, DAA messages may be intended for other flying UAVs, where a BRID message may be intended for law-enforcement officers or other agencies on the ground. As such, it may be useful to have an early indication of a message type (e.g., UAV-to-UAV or UAV-to-terrestrial UE) such that a receiver may avoid decoding particular messages unnecessarily. For example, a dedicated receiving device that only monitors for BRID messages may receive and decode BRID messages, however a generic UAV may benefit from skipping decoding of BRID messages broadcasted by other UAVs and intended for the dedicated receiving device. Alternatively, the dedicated receiving device that expects to decode BRID messages may avoid decoding DAA messages intended for other UAVs. As such, by using an early indication of a message type, a receiving device may refrain from decoding messages intended for other receiving devices, which may result in power savings, improve resource utilization, and reduce signaling collisions, among other benefits.

The techniques described herein support early indications of a message type for UAV communications, which may improve resource utilization and consumption as receiving devices may refrain from decoding messages intended for other recipients. A UAV (e.g., a transmitting device) may transmit control information that indicates a message type of a message, such as a physical sidelink shared channel (PSSCH) message. The message type may be one of multiple UAV broadcast message types, including UAV-to-UAV messages or UAV-to-terrestrial UE messages. For example, a UAV-to-UAV message may include a type of DAA message and a UAV-to-terrestrial UE message may include a BRID message. Other message types may include various types of DAA messages or BRID messages, or other broadcast messages as well. In some cases, the control information may indicate the message type using a destination layer 2 (L2) identifier (ID), a source L2 ID, or a combination thereof. The UAV may transmit the message to a receiving device (another UAV or a terrestrial UE) in accordance with the indicated message type. For example, the UAV may transmit a first type of UAV broadcast message to a second UAV and a second type of UAV broadcast message to a terrestrial UE. In this way, a receiving device may be aware of the message type and determine whether to decode the corresponding message based on the indicated message type and a type of the receiving device.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to early indication of a message type for UAVs.

FIG. 1 illustrates an example of a wireless communications system 100 that supports early indication of a message type for UAVs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105, UEs 115, and UAVs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), L2) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2(e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support early indication of a message type for UAVs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an ID for distinguishing neighboring cells (e.g., a physical cell ID (PCID), a virtual cell ID (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support communications between terrestrial wireless devices (e.g., UEs 115, network entities 105) and aerial vehicles such as UAVs 115 or other unmanned aerial systems. For example, the wireless communications system may support UAV-to-UAV communications (between UAVs 115 via a communication link 125) and UAV-to-terrestrial UE communications. Some types of UAV-to-UAV communications may include DAA messages, intended to assist UAVs 115 in avoiding collisions with each other. Such DAA messages may broadcast information about a UAV's position, headings, and other location information. Some types of UAV-to-terrestrial UE communications may include BRID messages that also indicate information regarding the position and heading of a UAV 115 and flight information for remote identification. In some examples, the terrestrial UE 115 may be associated with a user (e.g., a law enforcement agent) on the ground.

In addition, the wireless communications system 100 may support early indications of a message type for UAV communications, which may improve resource utilization and consumption as receiving devices may refrain from decoding messages intended for other recipients. A UAV 115 (e.g., a transmitting device) may transmit control information that indicates a message type of a message. The message type may be one of multiple UAV broadcast message types, including UAV-to-UAV messages or UAV-to-terrestrial UE messages. For example, a UAV-to-UAV message may include a type of DAA message and a UAV-to-terrestrial UE message may include a BRID message. In some cases, the control information may indicate the message type using a destination L2 ID, a source L2 ID, or a combination thereof. The UAV 115 may transmit the message to a receiving device (another UAV 115 or a terrestrial UE 115) in accordance with the indicated message type. For example, the UAV 115 may transmit a first type of UAV broadcast message to a second UAV 115 and a second type of UAV broadcast message to a terrestrial UE 115. In this way, a receiving device may be aware of the message type and determine whether to decode the corresponding message based on the indicated message type and on whether the receiving device is a UAV 115 or a terrestrial UE 115.

Figure 2:
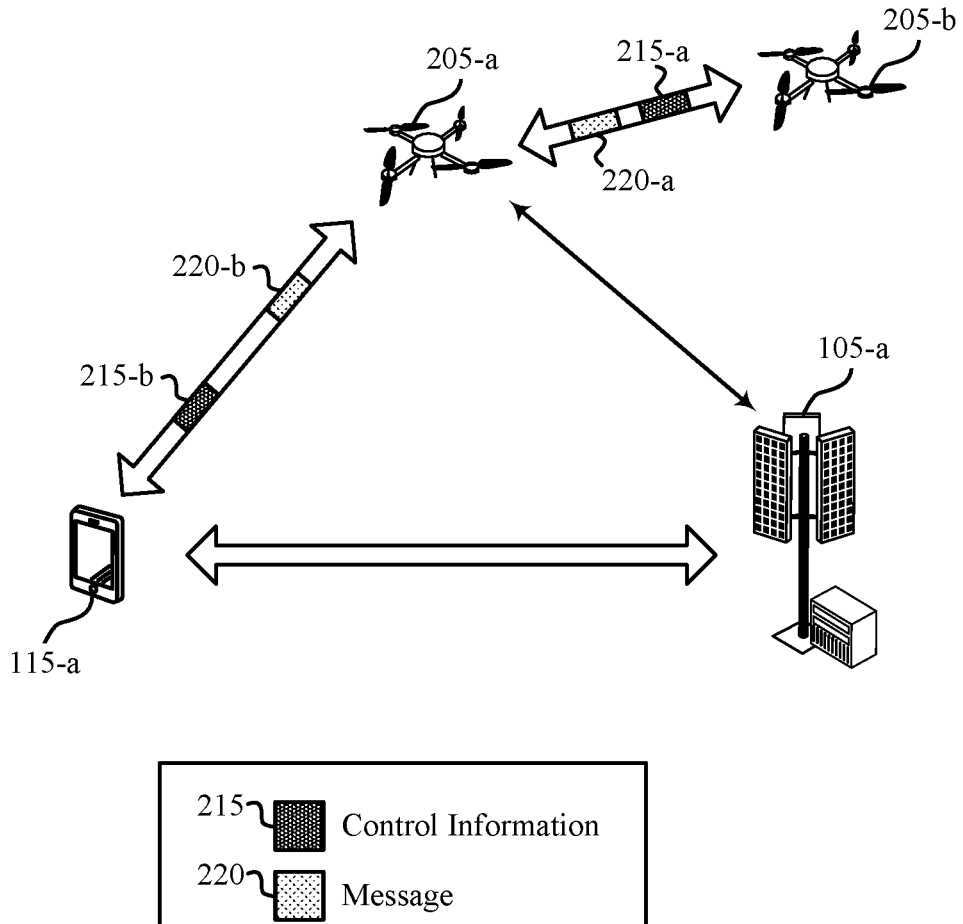
FIG. 2 illustrates an example of a wireless communications system that supports early indication of a message type for UAVs in accordance with one or more aspects of the present disclosure.

FIG. 2 illustrates an example of a wireless communications system 200 that supports early indication of a message type for UAVs in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a, a network entity 105-a, a UAV 205-a, and a UAV 205-b, which may be examples of corresponding devices described herein. The UE 115-a and the network entity 105-a may be terrestrial wireless devices (e.g., on the ground), and the UAVs 205 may be examples of drones or other aerial vehicles.

The wireless communications system 200 may support communications between the UE 115-a, the network entity 105-a, and the UAVs 205 via respective communication links, which may be examples of communication links 125 described herein with reference to FIG. 1. For example, the UE 115-a and the network entity 105-a may perform uplink and downlink communications via a Uu link, and the UAV 205 and the network entity 105-a may communicate via a Uu link. In addition, the UE 115-a may communicate with the UAV 205-a via a sidelink, and the UAV 205-a and the UAV 205-b may communicate via a sidelink. In this way, the wireless communications system 200 may support UAV-to-UAV communications and UAV-to-terrestrial UE communications Some types of UAV-to-UAV communications may include DAA messages, intended to assist the UAVs 205 in avoiding collisions with each other. Such DAA messages may broadcast information about a UAV's position, headings, and other location information. DAA messages may provide situational awareness, alerting, and avoidance used to maintain safe beyond visual line of sight (BVLOS) operation of the UAVs 205. In addition, different variants or types of the DAA messages may correspond to different requirements of the UAVs 205. For example, a broadcast DAA may indicate a location, a heading, a time, and other information (e.g., location and direction information) broadcast periodically by the UAVs 205. A DAA deconfliction message may be broadcast or unicast and may indicate data different from (or additional to) the information indicated in the broadcast DAA message.

Some types of UAV-to-terrestrial UE communications may include BRID messages that may indicate a UAS ID, UA type, UAS ID type, position and heading information of a UAV 205, and flight information for remote identification. In some examples, the UE 115-a (a terrestrial UE 115) may be associated with a user (e.g., a law enforcement agent) on the ground. A BRID message may indicate a UAS ID, a UAS ID type, and an unmanned aircraft (UA) type. For example, the UAS ID may indicate a serial number (e.g., expressed in a CTA-2063-A serial number format), a registration ID (e.g., if a Civil Aviation Authority (CAA) provides a method of registering the UAS, the number is provided by the CAA or an authorized representative), and a UAS traffic management (UTM) (e.g., a universal unique ID (UUID)), which may be a UTM-provided unique ID traceable to the registration ID that may act as a session ID to protect exposure of operationally sensitive information. The UAS ID type may indicate the serial number, the registration ID, or the UTM UUID. The UA type may help in inferring performance, speed, and duration of UAV flights (e.g., a fixed wing aircraft may generally fly in a forward direction as compared to a multi-rotor aircraft), differentiate aircraft types without sharing operationally sensitive information, and correlate visual observations with received data.

In some examples, the UAV 205-a may transmit, to a receiving device (including the UE 115-a, the UAV 205-b), or both, control information 215 that indicates a message type of a message 220. For example, the UAV 205-a may transmit control information 215-a to the UAV 205-b that indicates the message type of a message 220-a, or the UAV 205-a may transmit control information 215-b to the UE 115-a that indicates the message type of a message 220-b.

The message type may be one of a set of multiple aerial vehicle broadcast message types. For example, the aerial vehicle broadcast message types may include a first type, which may include a UAV-to-UAV communications type, or a second type, which may include a UAV-to-terrestrial communications type. In some examples, the UAV-to-UAV communications type (e.g., communications between the UAV 205-*a* and the UAV 205-*b*) may correspond to one or more types of DAA messages. For example, the types of DAA messages may include broadcast DAA messages and deconfliction DAA messages, among other types of DAA messages. Alternatively, the UAV-to-terrestrial communications type (e.g., communications between the UAV 205-*a* and the UE 115-*a*) may include BRID messages.

In some examples, the control information 215 may indicate the message type using a destination L2 ID, a source L2 ID, or both. A sidelink shared channel (e.g., PSSCH) MAC subheader may include a source field and a destination field. The destination and source L2 IDs may each include 24 bits. An 8-bit least significant bit (LSB) of the source L2 ID may be included in an SCI-2 and a 16-bit most significant bit (MSB) of the source L2 ID may be included in an SRC field of the MAC subheader. In addition, a 16-bit LSB of the destination L2 ID may be included in the SCI-2 and an 8-bit MSB of the destination L2 ID may be included in a DST field of the MAC subheader. A receiving device (e.g., a sidelink receiving UE) may combine the source and destination L2 IDs in the SCI-2 and the MAC subheader to determine a targeted destination and source of a sidelink transmission. In V2X communications, a V2X service type (e.g., PSID or ITS-AID) may be mapped to a destination L2 ID. In the case of LTE-V2X sidelink communications, the destination L2 ID may not be split and may be carried within a MAC header.

In some cases, the control information 215 may include a pre-configured, common destination L2 ID for broadcast. As the UE 115-*a* may not know the message type based on a destination L2 ID alone, the control information 215 may also include some other signaling or configuration to indicate the message type. As such, in addition to a common destination L2 ID (that is common regardless of whether the message type is a first or second type of aerial vehicle broadcast message), the control information 215 may include a QoS flow profile associated with the corresponding message 220, a reserved periodicity associated with the corresponding message 220, or a source L2 ID associated with one or the first type or the second type of aerial vehicle broadcast message. The receiving device may use the QoS flow profile, the reserved periodicity, or the source L2 ID in conjunction with the destination L2 ID to identify whether a message 220 is intended for the UE 115-*a* or the UAV 205-*b*. For example, the QoS flow profile may differentiate a DAA message from a BRID message as the DAA message may have a significantly higher transmission rate (e.g., be more frequent than) a BRID message.

In some examples, in addition to the common destination L2 ID, the control information 215 may include some quantity of priority bits (e.g., 3 bits) in SCI-1 to indicate the message type (as specified by a PC5 QoS ID (PQI)). That is, the control information 215 may be indicative of the message type through a set of priority bits associated with the message 220. Alternatively, in addition to the common destination L2 ID, the control information 215 may indicate a resource reservation period for periodic traffic in SCI-1 to indicate the message type. That is, the control information 215 may be indicative of the message type through a resource reservation period associated with a periodicity of the message 220. In some examples, the message type may be indicated by a combination of the priority bits and the resource reservation period.

Alternatively, the control information 215 may include a pre-configured, common destination L2 ID for each message type separately. As such, a receiving device (the UE 115-*a* or the UAV 205-*b*) may know if the message 220 is a BRID message or a type of DAA message based on the destination L2 ID included in the control information 215. In some examples, a mapping between a destination L2 ID and a message type (e.g., a UAV-to-UAV message type or a UAV-to-terrestrial UE message type) may be based on a configuration of different regions in deployment. That is, the control information 215 may be indicative of the message type through one of a first common destination ID associated with a first type of aerial vehicle message type (e.g., UAV-to-UAV communications) or a second common destination ID associated with a second type of aerial vehicle message type (e.g., UAV-to-terrestrial UE communications). In such cases, the first common destination ID or the second destination ID may be specific to a geographic region in which the UAV 205-*a* transmits the control information 215. Alternatively, the first and second common destination IDs may not be region-specific.

In some cases, the control information 215 may include a source L2 ID (self-assigned by the UAV 205-*a* such that the UE 115-*a* may refrain from reading the source L2 ID for broadcast). To indicate the message type, the source L2 ID may be included in the control information 215 in addition to one of the first common destination L2 ID or the second common destination L2 ID. In this way, although the control information 215 may include a single source L2 ID, the combination of the source L2 ID and the first common destination L2 ID or the second common destination L2 ID may indicate the message type.

In some examples, the control information 215 may include a pre-configured, common source L2 ID for each message type. In such cases, a receiving device may know if a message 220 is a type of DAA message or a BRID message based on the source L2 ID included in the control information 215. In some examples, the mapping between the common source L2 ID and the message type may be based on a configuration of different regions in deployment. That is, the control information 215 may indicate the message type through one of a first source ID associated with a first type of aerial vehicle broadcast message type (e.g., UAV-to-UAV communications) or a second source ID associated with a second type of aerial vehicle broadcast message type (e.g., UAV-to-terrestrial UE communications). The first source ID or the second source ID may be specific to a geographic region in which the UAV 205-*a* transmits the control information 215. Alternatively, the first and second common destination IDs may not be region-specific.

In some cases, at least part of a source L2 ID (included in the control information 215) may be determined for early indication of a message type. In such cases, a source L2 ID included in the control information 215 may include a first portion that is in SCI (e.g., SCI-2) and a second portion that is in a MAC subheader. That is, an ID type or a UA type of a BRID may be explicitly indicated in the source L2 ID in the control information 215, which may indicate the message type. This may help in improving detection of relevant messages and avoiding the decoding of unnecessary messages, thereby saving processing power. As described herein, the first portion and the second portion may include a combined 24 bits. In some cases, both an 8-bit LSB of the source L2 ID in the first portion (e.g., the SCI-2) and a 16-bit MSB of the source L2 ID in a SRC of the second portion (e.g., the MAC subheader) may be determined by part of a BRID (e.g., including an ID type or a UA type). That is, the control information 215 may be indicative of the message type through a source L2 ID, where the source L2 ID includes the first portion and the second portion, and where both the first portion and the second portion of the source L2 ID may indicate the message type.

Alternatively, the 8-bit LSB of the source L2 ID in the first portion may be determined by part of the BRID (e.g., an ID type of a UA type) and the 16-bit MSB of the source L2 ID in the SRC of the MAC subheader may be self-assigned by the UAV 205-*a*. In this way, the first portion of the source L2 ID may indicate the message type and the second portion of the source L2 ID may not indicate the message type. Alternatively, the 8-bit LSB of the source L2 ID in the first portion may be self-assigned by the UAV 205-*a* and the 16-bit MSB of the source L2 ID in the SRC of the MAC subheader may be determined in part by the BRID (e.g., including an ID type or a UA type). In some cases, at least one of the first portion of the source L2 ID or the second portion of the source L2 ID may indicate a BRID. In such cases, the indicated message type may be a UAV-to-terrestrial UE communications type based on the indicated BRID.

In some examples, the UAV 205-*a* may use signaling to indicate whether the control information 215 includes a source L2 ID in conjunction with the first or second common destination L2 ID, or that at least part of the source L2 ID is already determined for early indication of the message type. For example, the UAV 205-*a* may include a signaling bit (added in SCI-1 or SCI-2) that indicates whether the source ID included in the control information is indicative of the message type. This may indicate to the receiving device whether it may have to look up the source ID to determine the message type.

Alternatively, a source L2 ID included in the control information 215 may be determined by a network UE ID, which may be pre-configured for the UAV 205-*a* in a particular area or cell, where the UE 115-*a* or the UAV 205-*b* may know the mapping between the network UE ID and the BRID. In this way, the control information 215 may be indicative of the message type through a source ID provided to the UAV 205-*a* by a network entity 105-*a*. Additionally, or alternatively, the control information 215 may indicate the message type by distinguishing between a BRID message and various DAA message types through a logical channel ID (LCID) included in a MAC PDU.

The UAV 205-*a* may transmit a message 220 in accordance with the indicated message type. For example, the UAV 205-*a* may transmit the message 220-*a* to the UAV 205-*b* if the indicated message type is a UAV-to-UAV message, or the message 220-*b* to the UE 115-*a* if the indicated message type is a UAV-to-terrestrial UE message. Based on the indicated message type and on the type of receiving device receiving a message 220, the receiving device may determine whether to decode the message 220. That is, the UE 115-*a* may receive a BRID message and determine to decode it based on the control information 215-*a* indicated that the message type is a UAV-to-terrestrial communication type and based on the UE 115-*a* being a terrestrial wireless device.

Figure 3:
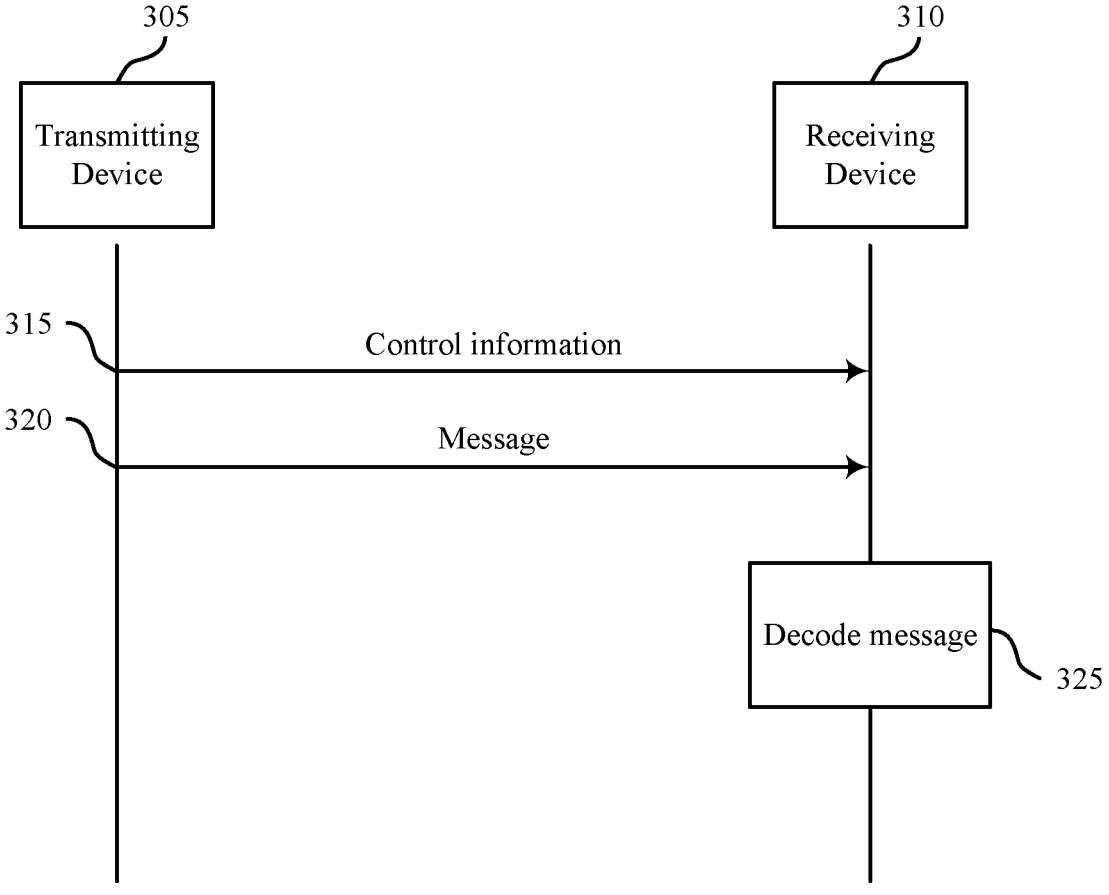
FIG. 3 illustrates an example of a process flow that supports early indication of a message type for UAVs in accordance with one or more aspects of the present disclosure.

FIG. 3 illustrates an example of a process flow 300 that supports early indication of a message type for UAVs in accordance with one or more aspects of the present disclosure. The process flow 300 may implement aspects of wireless communications systems 100 and 200, or may be implemented by aspects of the wireless communications system 100 and 200. For example, the process flow 300 may illustrate operations between a transmitting device 305 (e.g., a UAV 205) and a receiving device 310 (e.g., a UAV 205 or a UE 115), which may be examples of corresponding devices described herein. In the following description of the process flow 300, the operations between the transmitting device 305 and the receiving device 310 may be transmitted in a different order than the example order shown, or the operations performed by the transmitting device 305 and the receiving device 310 may be performed in different orders or at different times. Some operations may also be omitted from the process flow 300, and other operations may be added to the process flow 300.

At 315, the transmitting device 305 may transmit, to the receiving device 310, control information that indicates a message type of a message (e.g., SCI-2 of a PSSCH message and a MAC subheader), where the message type indicated by the control information is one of a set of multiple aerial vehicle broadcast message types. For example, the message type may be a first type of the aerial vehicle broadcast message types that corresponds to UAV-to-UAV communications, or a second type of the aerial vehicle broadcast messages that corresponds to UAV-to-terrestrial UE communications. In some examples, the UAV-to-UAV communications may include some type of DAA message and the UAV-to-terrestrial UE communications may include BRID messages.

At 320, the transmitting device 305 may transmit, to the receiving device 310, the message in accordance with the indicated message type. For example, the transmitting device 305 may transmit a DAA message if the indicated message type is the first type of the aerial vehicle broadcast message types, or the transmitting device 305 may transmit a BRID message if the indicated message type is the second type of the aerial vehicle broadcast message types.

At 325, the receiving device 310 may determine whether to decode the message based on the indicated message type and on a receiving device type of the receiving device 310. For example, if the indicated message type is the first type (e.g., a UAV-to-UAV message) but the receiving device 310 is a terrestrial UE, the receiving device 310 may determine not to decode the message. In such cases, if the receiving device 310 is another UAV, then the receiving device 310 may determine to decode the message.

Figure 4:
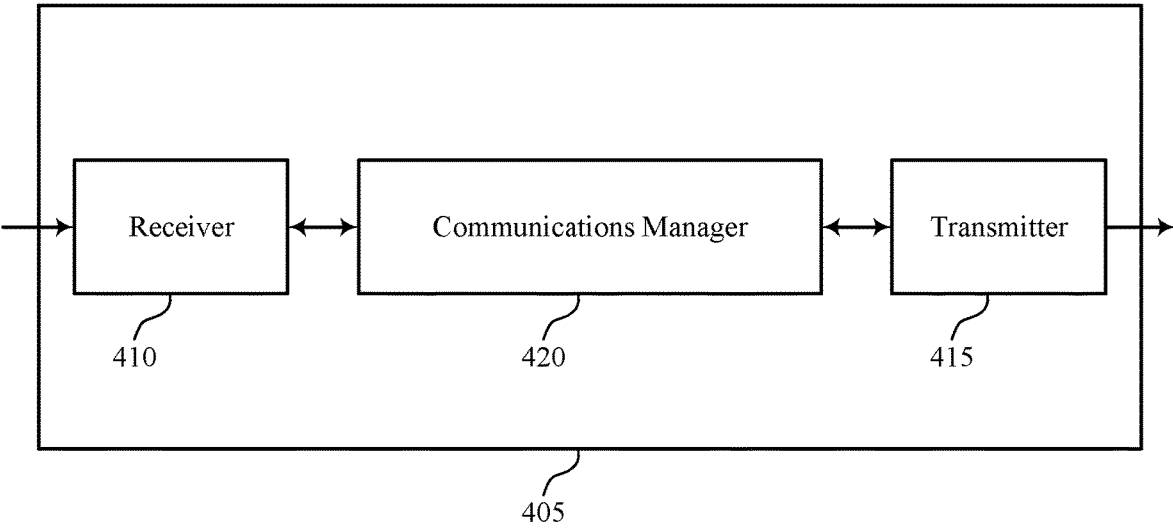
FIGS. 4 and 5 illustrate block diagrams of devices that support early indication of a message type for UAVs in accordance with one or more aspects of the present disclosure.

FIG. 4 illustrates a block diagram 400 of a device 405 that supports early indication of a message type for UAVs in accordance with one or more aspects of the present disclosure. The device 405 may be an example of aspects of a transmitting device as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to early indication of a message type for UAVs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to early indication of a message type for UAVs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of early indication of a message type for UAVs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a transmitting device of an aerial vehicle in accordance with examples as disclosed herein. For example, the communications manager 420 may be configured as or otherwise support a means for transmitting control information that indicates a message type of a message, where the message type indicated by the control information is one of a set of multiple aerial vehicle broadcast message types. The communications manager 420 may be configured as or otherwise support a means for transmitting the message in accordance with the indicated message type.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for providing an early indication of a message type for UAV messages, which may reduce power consumption, improve resource efficiency, and improve communications between UAVs and terrestrial wireless devices.

Figure 5:
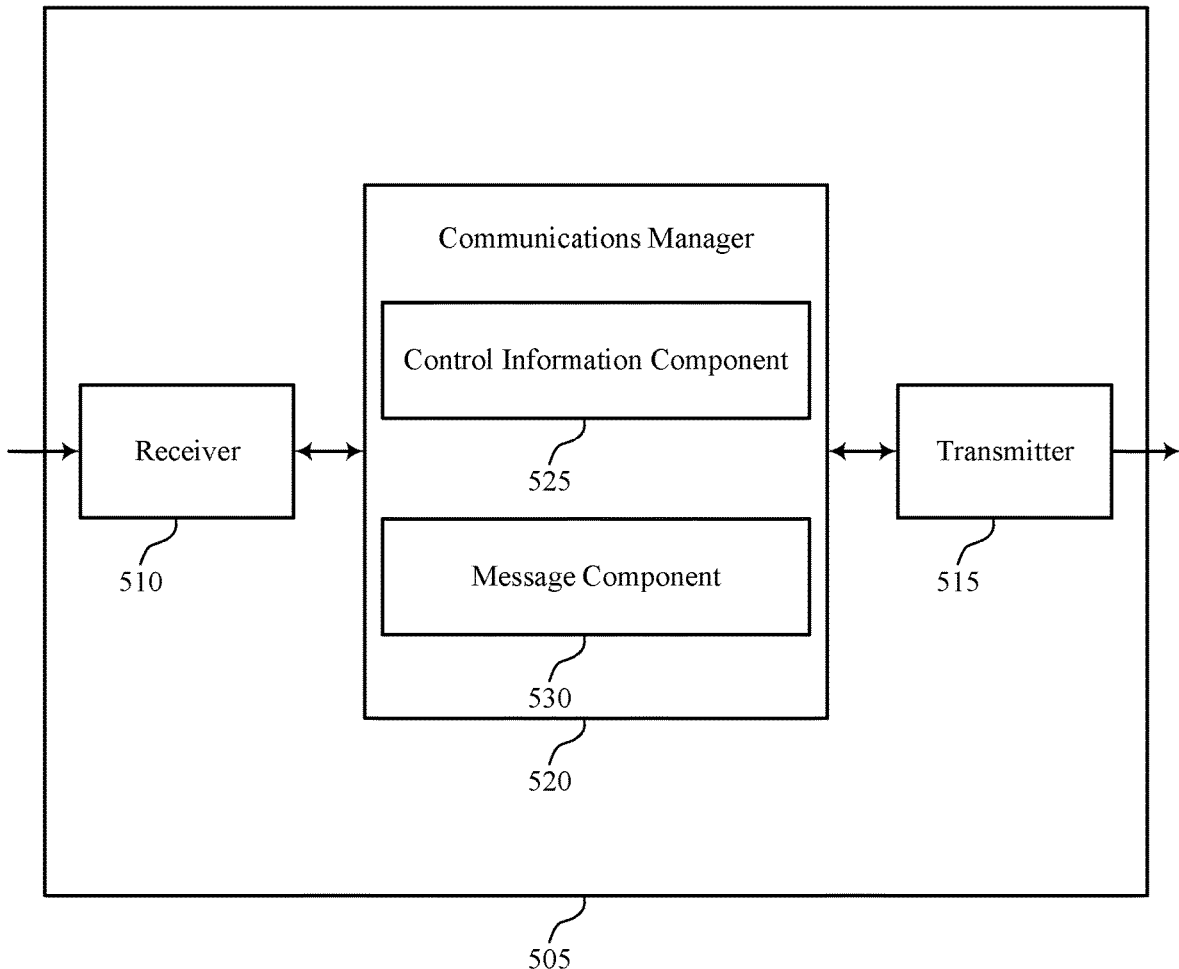

FIG. 5 illustrates a block diagram 500 of a device 505 that supports early indication of a message type for UAVs in accordance with one or more aspects of the present disclosure. The device 505 may be an example of aspects of a device 405 or a transmitting device as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to early indication of a message type for UAVs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to early indication of a message type for UAVs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of early indication of a message type for UAVs as described herein. For example, the communications manager 520 may include a control information component 525 a message component 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a transmitting device of an aerial vehicle in accordance with examples as disclosed herein. The control information component 525 may be configured as or otherwise support a means for transmitting control information that indicates a message type of a message, where the message type indicated by the control information is one of a set of multiple aerial vehicle broadcast message types. The message component 530 may be configured as or otherwise support a means for transmitting the message in accordance with the indicated message type.

FIG. 6 illustrates a block diagram 600 of a communications manager 620 that supports early indication of a message type for UAVs in accordance with one or more aspects of the present disclosure. The communications manager 620 may be an example of aspects of a communications manager 420, a communications manager 520, or both, as described herein. The communications manager 620, or various components thereof, may be an example of means for performing various aspects of early indication of a message type for UAVs as described herein. For example, the communications manager 620 may include a control information component 625, a message component 630, a destination ID component 635, a source ID component 640, or any combination thereof. Each of these components may communicate, directly or indirectly, with one another (e.g., via one or more buses).

The communications manager 620 may support wireless communication at a transmitting device of an aerial vehicle in accordance with examples as disclosed herein. The control information component 625 may be configured as or otherwise support a means for transmitting control information that indicates a message type of a message, where the message type indicated by the control information is one of a set of multiple aerial vehicle broadcast message types. The message component 630 may be configured as or otherwise support a means for transmitting the message in accordance with the indicated message type.

In some examples, the control information includes a common destination ID that is common regardless of whether the message type is a first type of the set of multiple aerial vehicle broadcast message types or a second type of the set of multiple aerial vehicle broadcast message types, where the control information is indicative of the message type through at least one of a quality-of-service profile associated with the message, a reserved periodicity associated with the message, or a source ID associated with one of the first type of the set of multiple aerial vehicle broadcast message types or the second type of the set of multiple aerial vehicle broadcast message types.

In some examples, the control information includes a common destination ID that is common regardless of whether the message type is a first type of the set of multiple aerial vehicle broadcast message types or a second type of the set of multiple aerial vehicle broadcast message types, where the control information is indicative of the message type through a set of priority bits associated with the message.

In some examples, the control information includes a common destination ID that is common regardless of whether the message type is a first type of the set of multiple aerial vehicle broadcast message types or a second type of the set of multiple aerial vehicle broadcast message types, where the control information is indicative of the message type through a resource reservation period associated with a periodicity of the message.

In some examples, the control information is indicative of the message type through one of a first common destination ID associated with a first type of the set of multiple aerial vehicle broadcast message types or a second common destination ID associated with a second type of the set of multiple aerial vehicle broadcast message types, where at least one of the first common destination ID or the second common destination ID is specific to a geographic region in which the aerial vehicle transmits the control information.

In some examples, the control information includes a source-layer ID in addition to one of the first common destination ID or the second common destination ID.

In some examples, the control information is indicative of the message type through one of a first source ID associated with a first type of the set of multiple aerial vehicle broadcast message types or a second source ID associated with a second type of the set of multiple aerial vehicle broadcast message types, where at least one of the first source ID or the second source ID is specific to a geographic region in which the aerial vehicle transmits the control information.

In some examples, the control information is indicative of the message type through a source ID, where the source ID includes a first portion that is in sidelink control information and a second portion that is in a MAC subheader. In some examples, both the first portion of the source ID and the second portion of the source ID are indicative of the message type.

In some examples, the first portion of the source ID is indicative of the message type, and where the second portion of the source ID is not indicative of the message type. In some examples, the second portion of the source ID is indicative of the message type, and where the first portion of the source ID is not indicative of the message type.

In some examples, at least one of the first portion of the source ID or the second portion of the source ID indicates a BRID. In some examples, the control information includes a signaling bit that indicates whether a source ID included in the control information is indicative of the message type.

In some examples, the control information is indicative of the message type through a source ID which is provided to an aerial device by a network. In some examples, the control information is indicative of the message type through a logical channel ID.

In some examples, the set of multiple aerial vehicle broadcast message types includes an aerial vehicle-to-aerial vehicle communications type or an aerial vehicle-to-terrestrial communications type.

In some examples, the aerial vehicle-to-aerial vehicle communications type is associated with one or more types of a DAA message and the aerial vehicle-to-terrestrial communications type is associated with a BRID message.

Figure 7:
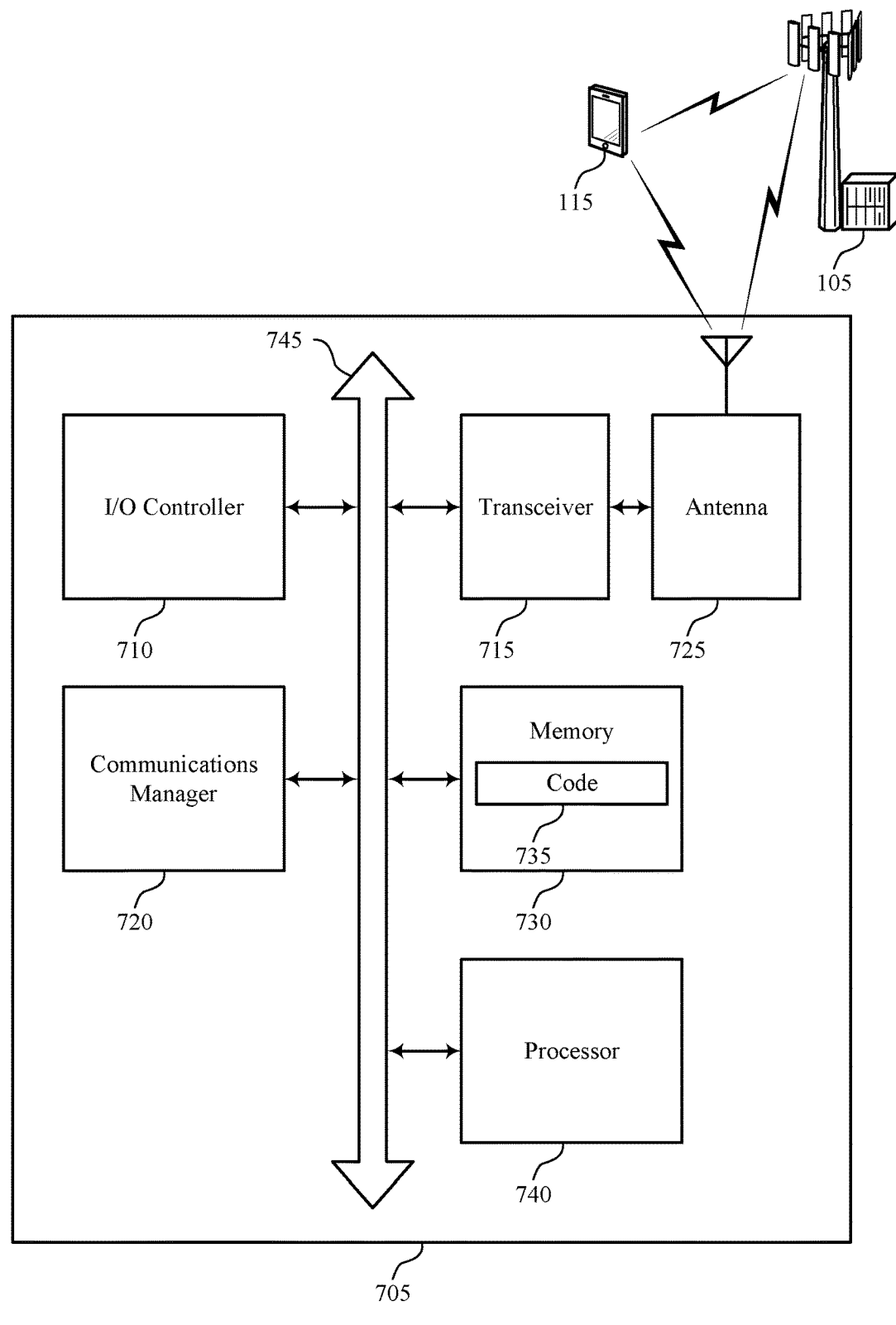
FIG. 7 illustrates a diagram of a system including a device that supports early indication of a message type for UAVs in accordance with one or more aspects of the present disclosure.

FIG. 7 illustrates a diagram of a system 700 including a device 705 that supports early indication of a message type for UAVs in accordance with one or more aspects of the present disclosure. The device 705 may be an example of or include the components of a device 405, a device 505, or a transmitting device as described herein. The device 705 may include components for bi-directional voice and data communications including components for transmitting and receiving communications, such as a communications manager 720, an I/O controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into processor 740. The processor 740 may be configured to execute computer-readable instructions stored in a memory (e.g., the memory 730) to cause the device 705 to perform various functions (e.g., functions or tasks supporting early indication of a message type for UAVs). For example, the device 705 or a component of the device 705 may include a processor 740 and memory 730 coupled with or to the processor 740, the processor 740 and memory 730 configured to perform various functions described herein.

The communications manager 720 may support wireless communication at a transmitting device of an aerial vehicle in accordance with examples as disclosed herein. For example, the communications manager 720 may be configured as or otherwise support a means for transmitting control information that indicates a message type of a message, where the message type indicated by the control information is one of a set of multiple aerial vehicle broadcast message types. The communications manager 720 may be configured as or otherwise support a means for transmitting the message in accordance with the indicated message type.

By including or configuring the communications manager 720 in accordance with examples as described herein, the device 705 may support techniques for providing an early indication of a message type for UAV messages, which may reduce power consumption, improve resource efficiency, and improve communications between UAVs and terrestrial wireless devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of early indication of a message type for UAVs as described herein, or the processor 740 and the memory 730 may be otherwise configured to perform or support such operations.

Figure 8:
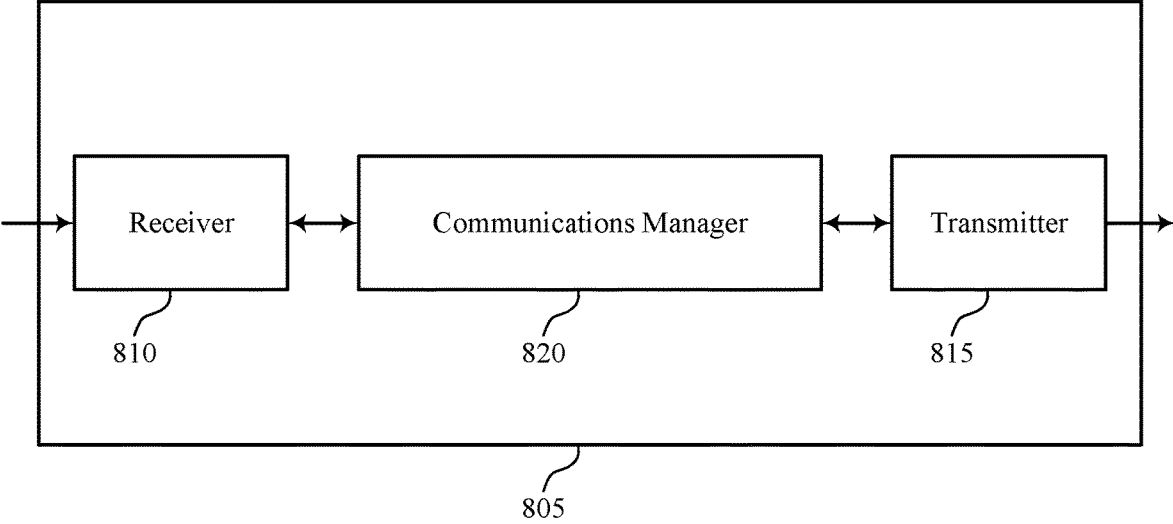
FIGS. 8 and 9 illustrate block diagrams of devices that support early indication of a message type for UAVs in accordance with one or more aspects of the present disclosure.

FIG. 8 illustrates a block diagram 800 of a device 805 that supports early indication of a message type for UAVs in accordance with one or more aspects of the present disclosure. The device 805 may be an example of aspects of a receiving device as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of early indication of a message type for UAVs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a receiving device in accordance with examples as disclosed herein. For example, the communications manager 820 may be configured as or otherwise support a means for receiving control information that indicates a message type of a message, where the message type indicated by the control information is one of a set of multiple aerial vehicle broadcast message types. The communications manager 820 may be configured as or otherwise support a means for receiving the message in accordance with the indicated message type.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for providing an early indication of a message type for UAV messages, which may reduce power consumption, improve resource efficiency, and improve communications between UAVs and terrestrial wireless devices.

Figure 9:
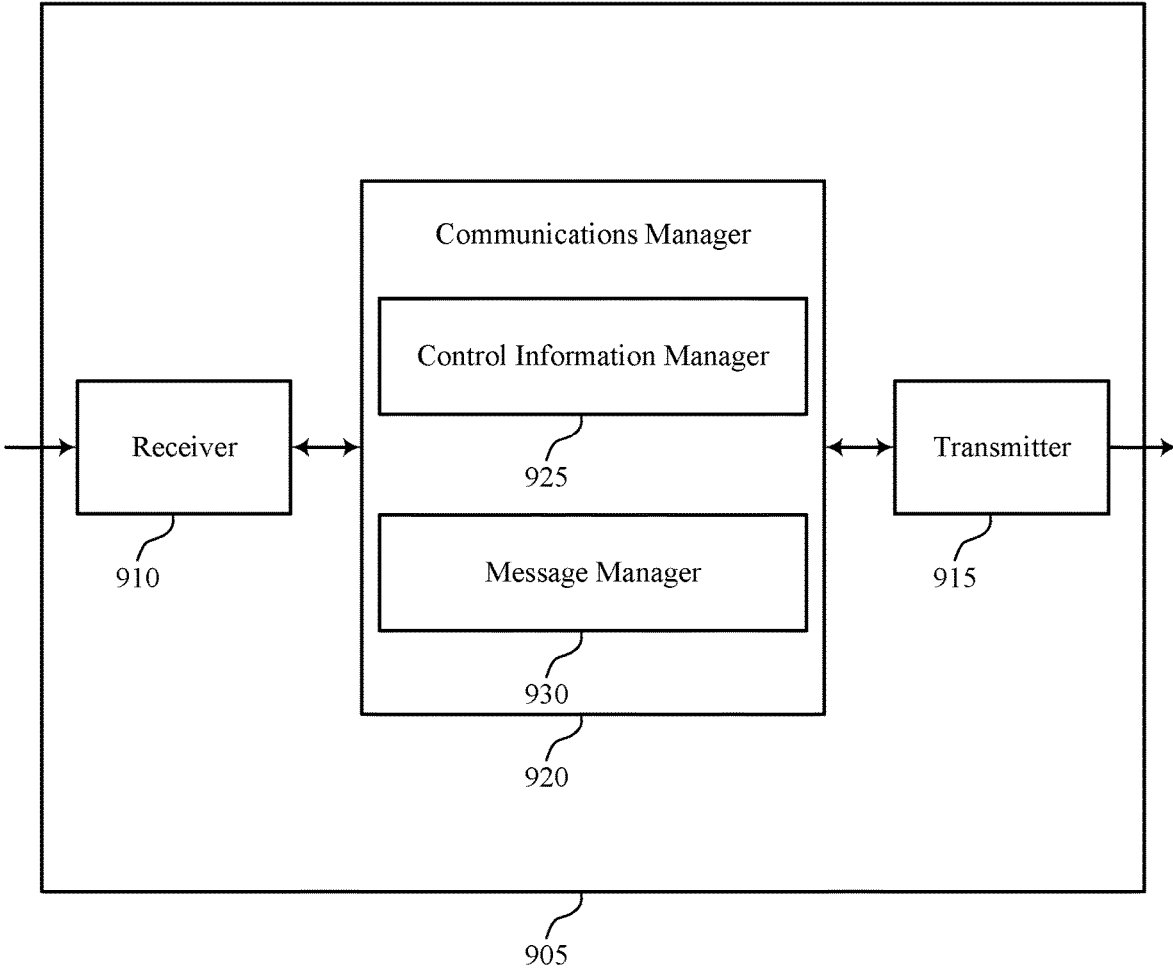

FIG. 9 illustrates a block diagram 900 of a device 905 that supports early indication of a message type for UAVs in accordance with one or more aspects of the present disclosure. The device 905 may be an example of aspects of a device 805 or a receiving device as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of early indication of a message type for UAVs as described herein. For example, the communications manager 920 may include a control information manager 925 a message manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a receiving device in accordance with examples as disclosed herein. The control information manager 925 may be configured as or otherwise support a means for receiving control information that indicates a message type of a message, where the message type indicated by the control information is one of a set of multiple aerial vehicle broadcast message types. The message manager 930 may be configured as or otherwise support a means for receiving the message in accordance with the indicated message type.

Figure 10:
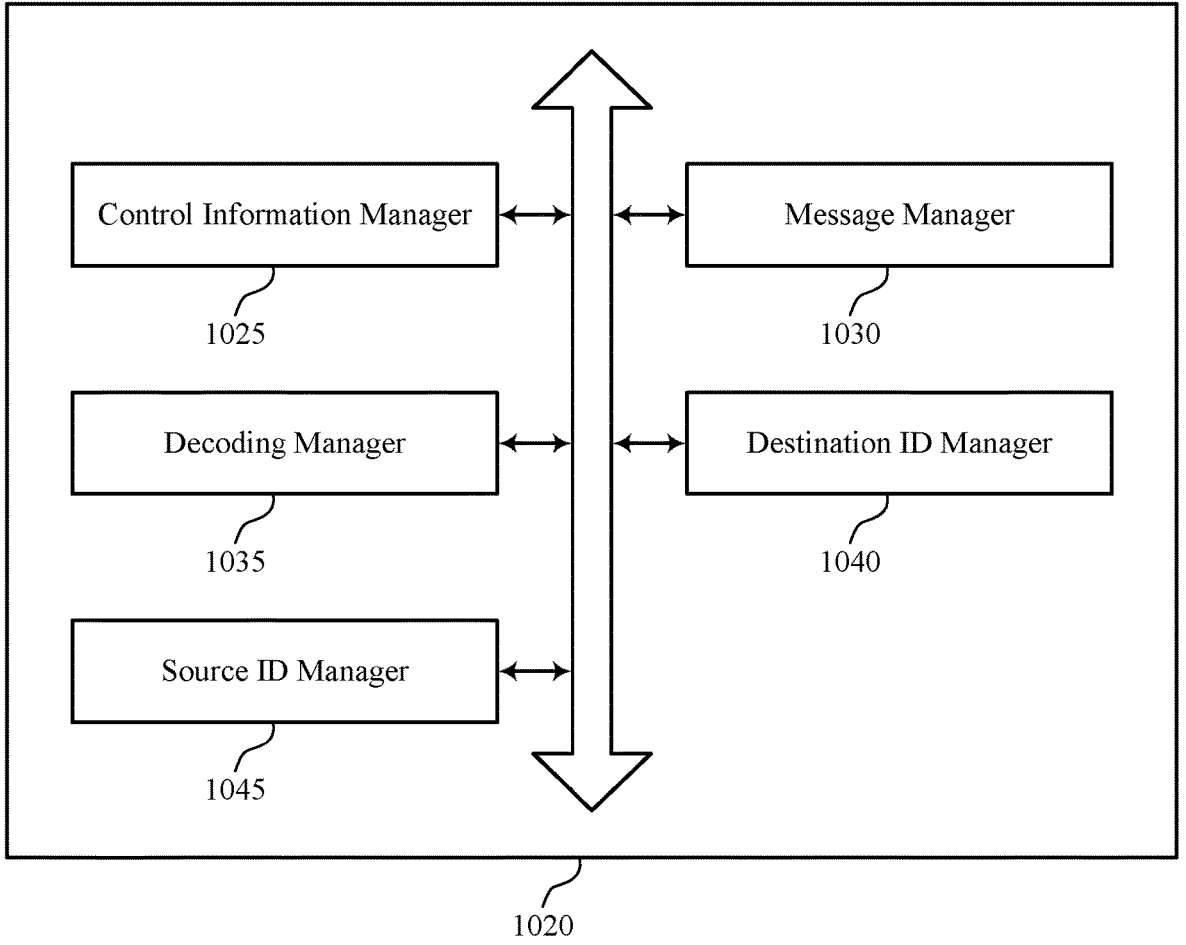
FIG. 10 illustrates a block diagram of a communications manager that supports early indication of a message type for UAVs in accordance with one or more aspects of the present disclosure.

FIG. 10 illustrates a block diagram 1000 of a communications manager 1020 that supports early indication of a message type for UAVs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of early indication of a message type for UAVs as described herein. For example, the communications manager 1020 may include a control information manager 1025, a message manager 1030, a decoding manager 1035, a destination ID manager 1040, a source ID manager 1045, or any combination thereof. Each of these components may communicate, directly or indirectly, with one another (e.g., via one or more buses).

The communications manager 1020 may support wireless communication at a receiving device in accordance with examples as disclosed herein. The control information manager 1025 may be configured as or otherwise support a means for receiving control information that indicates a message type of a message, where the message type indicated by the control information is one of a set of multiple aerial vehicle broadcast message types. The message manager 1030 may be configured as or otherwise support a means for receiving the message in accordance with the indicated message type.

In some examples, the decoding manager 1035 may be configured as or otherwise support a means for determining whether to decode the message based on the indicated message type and on a receiving device type of the receiving device.

In some examples, the control information includes a common destination ID that is common regardless of whether the message type is a first type of the set of multiple aerial vehicle broadcast message types or a second type of the set of multiple aerial vehicle broadcast message types, where the control information is indicative of the message type through at least one of a quality-of-service profile associated with the message, a reserved periodicity associated with the message, or a source ID associated with one of the first type of the set of multiple aerial vehicle broadcast message types or the second type of the set of multiple aerial vehicle broadcast message types.

In some examples, the control information includes a common destination ID that is common regardless of whether the message type is a first type of the set of multiple aerial vehicle broadcast message types or a second type of the set of multiple aerial vehicle broadcast message types, where the control information is indicative of the message type through a set of priority bits associated with the message.

In some examples, the control information includes a common destination ID that is common regardless of whether the message type is a first type of the set of multiple aerial vehicle broadcast message types or a second type of the set of multiple aerial vehicle broadcast message types, where the control information is indicative of the message type through a resource reservation period associated with a periodicity of the message.

In some examples, the control information is indicative of the message type through one of a first common destination ID associated with a first type of the set of multiple aerial vehicle broadcast message types or a second common destination ID associated with a second type of the set of multiple aerial vehicle broadcast message types, where at least one of the first common destination ID or the second common destination ID is specific to a geographic region in which an aerial vehicle transmits the control information.

In some examples, the control information includes a source-layer ID in addition to one of the first common destination ID or the second common destination ID.

In some examples, the control information is indicative of the message type through one of a first source ID associated with a first type of the set of multiple aerial vehicle broadcast message types or a second source ID associated with a second type of the set of multiple aerial vehicle broadcast message types, where at least one of the first source ID or the second source ID is specific to a geographic region in which an aerial vehicle transmits the control information.

In some examples, the control information is indicative of the message type through a source ID, where the source ID includes a first portion that is in sidelink control information and a second portion that is in a MAC subheader. In some examples, both the first portion of the source ID and the second portion of the source ID are indicative of the message type.

In some examples, the first portion of the source ID is indicative of the message type, and where the second portion of the source ID is not indicative of the message type. In some examples, the second portion of the source ID is indicative of the message type, and where the first portion of the source ID is not indicative of the message type.

In some examples, at least one of the first portion of the source ID or the second portion of the source ID indicates a BRID. In some examples, the control information includes a signaling bit that indicates whether a source ID included in the control information is indicative of the message type.

In some examples, the control information is indicative of the message type through a source ID which is provided to an aerial device by a network. In some examples, the control information is indicative of the message type through a logical channel ID.

In some examples, the set of multiple aerial vehicle broadcast message types includes an aerial vehicle-to-aerial vehicle communications type or an aerial vehicle-to-terrestrial communications type.

In some examples, the aerial vehicle-to-aerial vehicle communications type is associated with one or more types of a DAA message and the aerial vehicle-to-terrestrial communications type is associated with a BRID message.

Figure 11:
FIG. 11 illustrates a diagram of a system including a device that supports early indication of a message type for UAVs in accordance with one or more aspects of the present disclosure.

FIG. 11 illustrates a diagram of a system 1100 including a device 1105 that supports early indication of a message type for UAVs in accordance with one or more aspects of the present disclosure. The device 1105 may be an example of or include the components of a device 805, a device 905, or a receiving device as described herein. The device 1105 may include components for bi-directional voice and data communications including components for transmitting and receiving communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting early indication of a message type for UAVs). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a receiving device in accordance with examples as disclosed herein. For example, the communications manager 1120 may be configured as or otherwise support a means for receiving control information that indicates a message type of a message, where the message type indicated by the control information is one of a set of multiple aerial vehicle broadcast message types. The communications manager 1120 may be configured as or otherwise support a means for receiving the message in accordance with the indicated message type.

By including or configuring the communications manager 1120 in accordance with examples as described herein, the device 1105 may support techniques for providing an early indication of a message type for UAV messages, which may reduce power consumption, improve resource efficiency, and improve communications between UAVs and terrestrial wireless devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of early indication of a message type for UAVs as described herein, or the processor 1135 and the memory 1125 may be otherwise configured to perform or support such operations.

Figure 12:
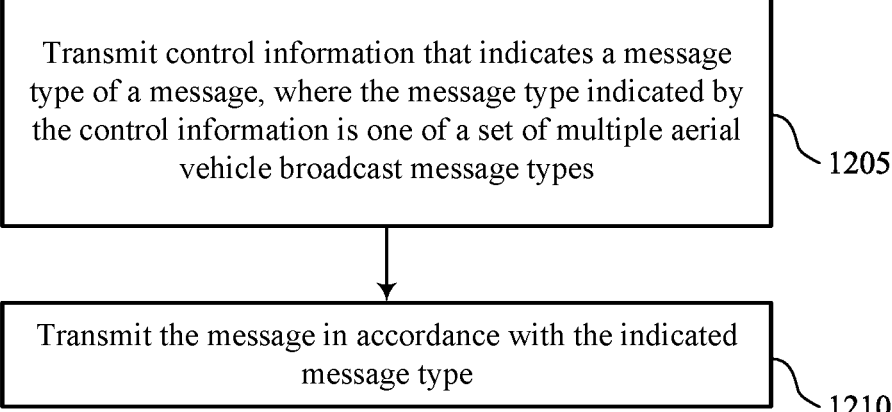

FIG. 12 illustrates a flowchart showing a method 1200 that supports early indication of a message type for UAVs in accordance with one or more aspects of the present disclosure. The operations of the method 1200 may be implemented by a transmitting device or its components as described herein. For example, the operations of the method 1200 may be performed by a transmitting device as described with reference to FIGS. 1 through 7. In some examples, a transmitting device may execute a set of instructions to control the functional elements of the transmitting device to perform the described functions. Additionally, or alternatively, the transmitting device may perform aspects of the described functions using special-purpose hardware.

At 1205, the method may include transmitting control information that indicates a message type of a message, where the message type indicated by the control information is one of a set of multiple aerial vehicle broadcast message types. The operations of 1205 may be performed in accordance with examples as disclosed herein. In some examples, aspects of the operations of 1205 may be performed by a control information component 625 as described with reference to FIG. 6.

At 1210, the method may include transmitting the message in accordance with the indicated message type. The operations of 1210 may be performed in accordance with examples as disclosed herein. In some examples, aspects of the operations of 1210 may be performed by a message component 630 as described with reference to FIG. 6.

FIG. 13 illustrates a flowchart showing a method 1300 that supports early indication of a message type for UAVs in accordance with one or more aspects of the present disclosure. The operations of the method 1300 may be implemented by a transmitting device or its components as described herein. For example, the operations of the method 1300 may be performed by a transmitting device as described with reference to FIGS. 1 through 7. In some examples, a transmitting device may execute a set of instructions to control the functional elements of the transmitting device to perform the described functions. Additionally, or alternatively, the transmitting device may perform aspects of the described functions using special-purpose hardware.

At 1305, the method may include transmitting control information that indicates a message type of a message, where the message type indicated by the control information is one of a set of multiple aerial vehicle broadcast message types, and where the control information includes a common destination ID that is common regardless of whether the message type is a first type of the set of multiple aerial vehicle broadcast message types or a second type of the set of multiple aerial vehicle broadcast message types, where the control information is indicative of the message type through at least one of a quality-of-service profile associated with the message, a reserved periodicity associated with the message, or a source ID associated with one of the first type of the set of multiple aerial vehicle broadcast message types or the second type of the set of multiple aerial vehicle broadcast message types. The operations of 1305 may be performed in accordance with examples as disclosed herein. In some examples, aspects of the operations of 1305 may be performed by a control information component 625 as described with reference to FIG. 6.

At 1310, the method may include transmitting the message in accordance with the indicated message type. The operations of 1310 may be performed in accordance with examples as disclosed herein. In some examples, aspects of the operations of 1310 may be performed by a message component 630 as described with reference to FIG. 6.

FIG. 14 illustrates a flowchart showing a method 1400 that supports early indication of a message type for UAVs in accordance with one or more aspects of the present disclosure. The operations of the method 1400 may be implemented by a transmitting device or its components as described herein. For example, the operations of the method 1400 may be performed by a transmitting device as described with reference to FIGS. 1 through 7. In some examples, a transmitting device may execute a set of instructions to control the functional elements of the transmitting device to perform the described functions. Additionally, or alternatively, the transmitting device may perform aspects of the described functions using special-purpose hardware.

At 1405, the method may include transmitting control information that indicates a message type of a message, where the message type indicated by the control information is one of a set of multiple aerial vehicle broadcast message types, and where the control information may be indicative of the message type through one of a first source ID associated with a first type of the set of multiple aerial vehicle broadcast message types or a second source ID associated with a second type of the set of multiple aerial vehicle broadcast message types, where at least one of the first source ID or the second source ID is specific to a geographic region in which the aerial vehicle transmits the control information. The operations of 1405 may be performed in accordance with examples as disclosed herein. In some examples, aspects of the operations of 1405 may be performed by a control information component 625 as described with reference to FIG. 6.

At 1410, the method may include transmitting the message in accordance with the indicated message type. The operations of 1410 may be performed in accordance with examples as disclosed herein. In some examples, aspects of the operations of 1410 may be performed by a message component 630 as described with reference to FIG. 6.

Figure 15:
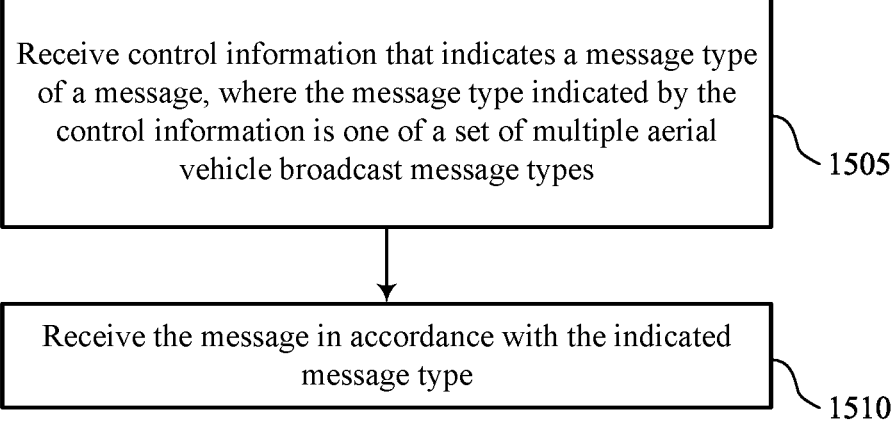

FIG. 15 illustrates a flowchart showing a method 1500 that supports early indication of a message type for UAVs in accordance with one or more aspects of the present disclosure. The operations of the method 1500 may be implemented by a receiving device or its components as described herein. For example, the operations of the method 1500 may be performed by a receiving device as described with reference to FIGS. 1 through 3 and 8 through 11. In some examples, a receiving device may execute a set of instructions to control the functional elements of the receiving device to perform the described functions. Additionally, or alternatively, the receiving device may perform aspects of the described functions using special-purpose hardware.

At 1505, the method may include receiving control information that indicates a message type of a message, where the message type indicated by the control information is one of a set of multiple aerial vehicle broadcast message types. The operations of 1505 may be performed in accordance with examples as disclosed herein. In some examples, aspects of the operations of 1505 may be performed by a control information manager 1025 as described with reference to FIG. 10.

At 1510, the method may include receiving the message in accordance with the indicated message type. The operations of 1510 may be performed in accordance with examples as disclosed herein. In some examples, aspects of the operations of 1510 may be performed by a message manager 1030 as described with reference to FIG. 10.

FIG. 16 illustrates a flowchart showing a method 1600 that supports early indication of a message type for UAVs in accordance with one or more aspects of the present disclosure. The operations of the method 1600 may be implemented by a receiving device or its components as described herein. For example, the operations of the method 1600 may be performed by a receiving device as described with reference to FIGS. 1 through 3 and 8 through 11. In some examples, a receiving device may execute a set of instructions to control the functional elements of the receiving device to perform the described functions. Additionally, or alternatively, the receiving device may perform aspects of the described functions using special-purpose hardware.

At 1605, the method may include receiving control information that indicates a message type of a message, where the message type indicated by the control information is one of a set of multiple aerial vehicle broadcast message types. The operations of 1605 may be performed in accordance with examples as disclosed herein. In some examples, aspects of the operations of 1605 may be performed by a control information manager 1025 as described with reference to FIG. 10.

At 1610, the method may include receiving the message in accordance with the indicated message type. The operations of 1610 may be performed in accordance with examples as disclosed herein. In some examples, aspects of the operations of 1610 may be performed by a message manager 1030 as described with reference to FIG. 10.

At 1615, the method may include determining whether to decode the message based on the indicated message type and on a receiving device type of the receiving device. The operations of 1615 may be performed in accordance with examples as disclosed herein. In some examples, aspects of the operations of 1615 may be performed by a decoding manager 1035 as described with reference to FIG. 10.

FIG. 17 illustrates a flowchart showing a method 1700 that supports early indication of a message type for UAVs in accordance with one or more aspects of the present disclosure. The operations of the method 1700 may be implemented by a receiving device or its components as described herein. For example, the operations of the method 1700 may be performed by a receiving device as described with reference to FIGS. 1 through 3 and 8 through 11. In some examples, a receiving device may execute a set of instructions to control the functional elements of the receiving device to perform the described functions. Additionally, or alternatively, the receiving device may perform aspects of the described functions using special-purpose hardware.

At 1705, the method may include receiving control information that indicates a message type of a message, where the message type indicated by the control information is one of a set of multiple aerial vehicle broadcast message types, and where the control information may be indicative of the message type through one of a first common destination ID associated with a first type of the set of multiple aerial vehicle broadcast message types or a second common destination ID associated with a second type of the set of multiple aerial vehicle broadcast message types, where at least one of the first common destination ID or the second common destination ID is specific to a geographic region in which an aerial vehicle transmits the control information. The operations of 1705 may be performed in accordance with examples as disclosed herein. In some examples, aspects of the operations of 1705 may be performed by a control information manager 1025 as described with reference to FIG. 10.

At 1710, the method may include receiving the message in accordance with the indicated message type. The operations of 1710 may be performed in accordance with examples as disclosed herein. In some examples, aspects of the operations of 1710 may be performed by a message manager 1030 as described with reference to FIG. 10.

The following provides an overview of aspects of the present disclosure:

Aspect 1: A method for wireless communication at a transmitting device of an aerial vehicle, comprising: transmitting control information that indicates a message type of a sidelink shared channel message, wherein the message type indicated by the control information is one of a plurality of aerial vehicle broadcast message types; and transmitting the sidelink shared channel message in accordance with the indicated message type.

Aspect 2: The method of aspect 1, wherein the control information includes a common destination ID that is common regardless of whether the message type is a first type of the plurality of aerial vehicle broadcast message types or a second type of the plurality of aerial vehicle broadcast message types, wherein the control information is indicative of the message type through at least one of a quality-of-service profile associated with the sidelink shared channel message, a reserved periodicity associated with the sidelink shared channel message, or a source ID associated with one of the first type of the plurality of aerial vehicle broadcast message types or the second type of the plurality of aerial vehicle broadcast message types.

Aspect 3: The method of any of aspects 1 through 2, wherein the control information includes a common destination ID that is common regardless of whether the message type is a first type of the plurality of aerial vehicle broadcast message types or a second type of the plurality of aerial vehicle broadcast message types, wherein the control information is indicative of the message type through a set of priority bits associated with the sidelink shared channel message.

Aspect 4: The method of any of aspects 1 through 3, wherein the control information includes a common destination ID that is common regardless of whether the message type is a first type of the plurality of aerial vehicle broadcast message types or a second type of the plurality of aerial vehicle broadcast message types, wherein the control information is indicative of the message type through a resource reservation period associated with a periodicity of the sidelink shared channel message.

Aspect 5: The method of any of aspects 1 through 4, wherein the control information is indicative of the message type through one of a first common destination ID associated with a first type of the plurality of aerial vehicle broadcast message types or a second common destination ID associated with a second type of the plurality of aerial vehicle broadcast message types, wherein at least one of the first common destination ID or the second common destination ID is specific to a geographic region in which the aerial vehicle transmits the control information.

Aspect 6: The method of aspect 5, wherein the control information includes a source-layer ID in addition to one of the first common destination ID or the second common destination ID.

Aspect 7: The method of any of aspects 1 through 6, wherein the control information is indicative of the message type through one of a first source ID associated with a first type of the plurality of aerial vehicle broadcast message types or a second source ID associated with a second type of the plurality of aerial vehicle broadcast message types, wherein at least one of the first source ID or the second source ID is specific to a geographic region in which the aerial vehicle transmits the control information.

Aspect 8: The method of any of aspects 1 through 7, wherein the control information is indicative of the message type through a source ID, wherein the source ID includes a first portion that is in sidelink control information and a second portion that is in a medium access control subheader.

Aspect 9: The method of aspect 8, wherein both the first portion of the source ID and the second portion of the source ID are indicative of the message type.

Aspect 10: The method of any of aspects 8 through 9, wherein the first portion of the source ID is indicative of the message type, and wherein the second portion of the source ID is not indicative of the message type.

Aspect 11: The method of any of aspects 8 through 10, wherein the second portion of the source ID is indicative of the message type, and wherein the first portion of the source ID is not indicative of the message type.

Aspect 12: The method of any of aspects 8 through 11, wherein at least one of the first portion of the source ID or the second portion of the source ID indicates a BRID.

Aspect 13: The method of any of aspects 1 through 12, wherein the control information includes a signaling bit that indicates whether a source ID included in the control information is indicative of the message type.

Aspect 14: The method of any of aspects 1 through 13, wherein the control information is indicative of the message type through a source ID which is provided to an aerial device by a network.

Aspect 15: The method of any of aspects 1 through 14, wherein the control information is indicative of the message type through a logical channel ID.

Aspect 16: The method of any of aspects 1 through 15, wherein the plurality of aerial vehicle broadcast message types includes an aerial vehicle-to-aerial vehicle communications type or an aerial vehicle-to-terrestrial communications type.

Aspect 17: The method of aspect 16, wherein the aerial vehicle-to-aerial vehicle communications type is associated with one or more types of a DAA message and the aerial vehicle-to-terrestrial communications type is associated with a BRID message.

Aspect 18: A method for wireless communication at a receiving device, comprising: receiving control information that indicates a message type of a sidelink shared channel message, wherein the message type indicated by the control information is one of a plurality of aerial vehicle broadcast message types; and receiving the sidelink shared channel message in accordance with the indicated message type.

Aspect 19: The method of aspect 18, further comprising: determining whether to decode the sidelink shared channel message based at least in part on the indicated message type and on a receiving device type of the receiving device.

Aspect 20: The method of any of aspects 18 through 19, wherein the control information includes a common destination ID that is common regardless of whether the message type is a first type of the plurality of aerial vehicle broadcast message types or a second type of the plurality of aerial vehicle broadcast message types, wherein the control information is indicative of the message type through at least one of a quality-of-service profile associated with the sidelink shared channel message, a reserved periodicity associated with the sidelink shared channel message, or a source ID associated with one of the first type of the plurality of aerial vehicle broadcast message types or the second type of the plurality of aerial vehicle broadcast message types.

Aspect 21: The method of any of aspects 18 through 20, wherein the control information includes a common destination ID that is common regardless of whether the message type is a first type of the plurality of aerial vehicle broadcast message types or a second type of the plurality of aerial vehicle broadcast message types, wherein the control information is indicative of the message type through a set of priority bits associated with the sidelink shared channel message.

Aspect 22: The method of any of aspects 18 through 21, wherein the control information includes a common destination ID that is common regardless of whether the message type is a first type of the plurality of aerial vehicle broadcast message types or a second type of the plurality of aerial vehicle broadcast message types, wherein the control information is indicative of the message type through a resource reservation period associated with a periodicity of the sidelink shared channel message.

Aspect 23: The method of any of aspects 18 through 22, wherein the control information is indicative of the message type through one of a first common destination ID associated with a first type of the plurality of aerial vehicle broadcast message types or a second common destination ID associated with a second type of the plurality of aerial vehicle broadcast message types, wherein at least one of the first common destination ID or the second common destination ID is specific to a geographic region in which an aerial vehicle transmits the control information.

Aspect 24: The method of aspect 23, wherein the control information includes a source-layer ID in addition to one of the first common destination ID or the second common destination ID.

Aspect 25: The method of any of aspects 18 through 24, wherein the control information is indicative of the message type through one of a first source ID associated with a first type of the plurality of aerial vehicle broadcast message types or a second source ID associated with a second type of the plurality of aerial vehicle broadcast message types, wherein at least one of the first source ID or the second source ID is specific to a geographic region in which an aerial vehicle transmits the control information.

Aspect 26: The method of any of aspects 18 through 25, wherein the control information is indicative of the message type through a source ID, wherein the source ID includes a first portion that is in sidelink control information and a second portion that is in a medium access control subheader.

Aspect 27: The method of aspect 26, wherein both the first portion of the source ID and the second portion of the source ID are indicative of the message type.

Aspect 28: The method of any of aspects 26 through 27, wherein the first portion of the source ID is indicative of the message type, and wherein the second portion of the source ID is not indicative of the message type.

Aspect 29: The method of any of aspects 26 through 28, wherein the second portion of the source ID is indicative of the message type, and wherein the first portion of the source ID is not indicative of the message type.

Aspect 30: The method of any of aspects 26 through 29, wherein at least one of the first portion of the source ID or the second portion of the source ID indicates a BRID.

Aspect 31: The method of any of aspects 18 through 30, wherein the control information includes a signaling bit that indicates whether a source ID included in the control information is indicative of the message type.

Aspect 32: The method of any of aspects 18 through 31, wherein the control information is indicative of the message type through a source ID which is provided to an aerial device by a network.

Aspect 33: The method of any of aspects 18 through 32, wherein the control information is indicative of the message type through a logical channel ID.

Aspect 34: The method of any of aspects 18 through 33, wherein the plurality of aerial vehicle broadcast message types includes an aerial vehicle-to-aerial vehicle communications type or an aerial vehicle-to-terrestrial communications type.

Aspect 35: The method of aspect 34, wherein the aerial vehicle-to-aerial vehicle communications type is associated with one or more types of a DAA message and the aerial vehicle-to-terrestrial communications type is associated with a BRID message.

Aspect 36: An apparatus for wireless communication at a transmitting device of an aerial vehicle, comprising a processor; memory coupled with the processor; and instructions stored in the memory and executable by the processor to cause the apparatus to perform a method of any of aspects 1 through 17.

Aspect 37: An apparatus for wireless communication at a transmitting device of an aerial vehicle, comprising at least one means for performing a method of any of aspects 1 through 17.

Aspect 38: A non-transitory computer-readable medium storing code for wireless communication at a transmitting device of an aerial vehicle, the code comprising instructions executable by a processor to perform a method of any of aspects 1 through 17.

Aspect 39: An apparatus for wireless communication at a receiving device, comprising a processor; memory coupled with the processor; and instructions stored in the memory and executable by the processor to cause the apparatus to perform a method of any of aspects 18 through 35.

Aspect 40: An apparatus for wireless communication at a receiving device, comprising at least one means for performing a method of any of aspects 18 through 35.

Aspect 41: A non-transitory computer-readable medium storing code for wireless communication at a receiving device, the code comprising instructions executable by a processor to perform a method of any of aspects 18 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a transmitting device of an aerial vehicle, comprising:
   one or more processors;
   one or more memories coupled with the one or more processors; and
   instructions stored in the one or more memories and executable by the one or more processors to cause the apparatus to:
      transmit control information that indicates a message type of a message, wherein the message type indicated by the control information is one of a plurality of aerial vehicle broadcast message types and the control information is indicative of the message type using a destination identifier, a source identifier, or combination thereof, wherein the source identifier includes a first portion that is in sidelink control information and a second portion that is in a medium access control subheader; and
      transmit the message in accordance with the indicated message type.

2. The apparatus of claim 1, wherein the destination identifier is a common destination identifier that is common regardless of whether the message type is a first type of the plurality of aerial vehicle broadcast message types or a second type of the plurality of aerial vehicle broadcast message types, wherein the control information is indicative of the message type through at least one of a quality-of-service profile associated with the message, a reserved periodicity associated with the message, or a source identifier associated with one of the first type of the plurality of aerial vehicle broadcast message types or the second type of the plurality of aerial vehicle broadcast message types.

3. The apparatus of claim 1, wherein the destination identifier is a common destination identifier that is common regardless of whether the message type is a first type of the plurality of aerial vehicle broadcast message types or a second type of the plurality of aerial vehicle broadcast message types, wherein the control information is indicative of the message type through a set of priority bits associated with the message.

4. The apparatus of claim 1, wherein the destination identifier is a common destination identifier that is common regardless of whether the message type is a first type of the plurality of aerial vehicle broadcast message types or a second type of the plurality of aerial vehicle broadcast message types, wherein the control information is indicative of the message type through a resource reservation period associated with a periodicity of the message.

5. The apparatus of claim 1, wherein the control information is indicative of the message type through one of a first common destination identifier associated with a first type of the plurality of aerial vehicle broadcast message types or a second common destination identifier associated with a second type of the plurality of aerial vehicle broadcast message types, wherein at least one of the first common destination identifier or the second common destination identifier is specific to a geographic region in which the aerial vehicle transmits the control information.

6. The apparatus of claim 5, wherein the control information includes a source-layer identifier in addition to one of the first common destination identifier or the second common destination identifier.

7. The apparatus of claim 1, wherein the control information is indicative of the message type through one of a first source identifier associated with a first type of the plurality of aerial vehicle broadcast message types or a second source identifier associated with a second type of the plurality of aerial vehicle broadcast message types, wherein at least one of the first source identifier or the second source identifier is specific to a geographic region in which the aerial vehicle transmits the control information.

8. The apparatus of claim 1, wherein both the first portion of the source identifier and the second portion of the source identifier are indicative of the message type.

9. The apparatus of claim 1, wherein the first portion of the source identifier is indicative of the message type, and wherein the second portion of the source identifier is not indicative of the message type.

10. The apparatus of claim 1, wherein the second portion of the source identifier is indicative of the message type, and wherein the first portion of the source identifier is not indicative of the message type.

11. The apparatus of claim 1, wherein at least one of the first portion of the source identifier or the second portion of the source identifier indicates a broadcast remote identifier.

12. The apparatus of claim 1, wherein the control information includes a signaling bit that indicates whether the source identifier included in the control information is indicative of the message type.

13. The apparatus of claim 1, wherein the control information is indicative of the message type through the source identifier which is provided to an aerial device by a network.

14. The apparatus of claim 1, wherein the control information is indicative of the message type through a logical channel identifier.

15. The apparatus of claim 1, wherein the plurality of aerial vehicle broadcast message types includes an aerial vehicle-to-aerial vehicle communications type or an aerial vehicle-to-terrestrial communications type.

16. The apparatus of claim 15, wherein the aerial vehicle-to-aerial vehicle communications type is associated with one or more types of a detect and avoid message and the aerial vehicle-to-terrestrial communications type is associated with a broadcast remote identifier message.

17. An apparatus for wireless communication at a receiving device, comprising:
one or more processors;
one or more memories coupled with the one or more processors; and
instructions stored in the one or more memories and executable by the one or more processors to cause the apparatus to:
receive control information, from a transmitting device of an aerial vehicle, that indicates a message type of a message, wherein the message type indicated by the control information is one of a plurality of aerial vehicle broadcast message types and the control information is indicative of the message type using a destination identifier, a source identifier, or combination thereof, wherein the source identifier includes a first portion that is in sidelink control information and a second portion that is in a medium access control subheader; and
receive the message in accordance with the indicated message type.

18. The apparatus of claim 17, wherein the instructions are further executable by the processor to cause the apparatus to:

determine whether to decode the message based at least in part on the indicated message type and on a receiving device type of the receiving device.

19. The apparatus of claim 17, wherein the destination identifier is a common destination identifier that is common regardless of whether the message type is a first type of the plurality of aerial vehicle broadcast message types or a second type of the plurality of aerial vehicle broadcast message types, wherein the control information is indicative of the message type through at least one of a quality-of-service profile associated with the message, a reserved periodicity associated with the message, or a source identifier associated with one of the first type of the plurality of aerial vehicle broadcast message types or the second type of the plurality of aerial vehicle broadcast message types.

20. The apparatus of claim 17, wherein the destination identifier is a common destination identifier that is common regardless of whether the message type is a first type of the plurality of aerial vehicle broadcast message types or a second type of the plurality of aerial vehicle broadcast message types, wherein the control information is indicative of the message type through a set of priority bits associated with the message.

21. The apparatus of claim 17, wherein the destination identifier is a common destination identifier that is common regardless of whether the message type is a first type of the plurality of aerial vehicle broadcast message types or a second type of the plurality of aerial vehicle broadcast message types, wherein the control information is indicative of the message type through a resource reservation period associated with a periodicity of the message.

22. The apparatus of claim 17, wherein the control information is indicative of the message type through one of a first common destination identifier associated with a first type of the plurality of aerial vehicle broadcast message types or a second common destination identifier associated with a second type of the plurality of aerial vehicle broadcast message types, wherein at least one of the first common destination identifier or the second common destination identifier is specific to a geographic region in which an aerial vehicle transmits the control information.

23. The apparatus of claim 22, wherein the control information includes a source-layer identifier in addition to one of the first common destination identifier or the second common destination identifier.

24. The apparatus of claim 17, wherein the control information is indicative of the message type through one of a first source identifier associated with a first type of the plurality of aerial vehicle broadcast message types or a second source identifier associated with a second type of the plurality of aerial vehicle broadcast message types, wherein at least one of the first source identifier or the second source identifier is specific to a geographic region in which an aerial vehicle transmits the control information.

25. The apparatus of claim 17, wherein both the first portion of the source identifier and the second portion of the source identifier are indicative of the message type.

26. The apparatus of claim 17, wherein the first portion of the source identifier is indicative of the message type, and wherein the second portion of the source identifier is not indicative of the message type.

27. A method for wireless communication at a transmitting device of an aerial vehicle, comprising:
transmitting control information that indicates a message type of a message, wherein the message type indicated by the control information is one of a plurality of aerial vehicle broadcast message types and the control information is indicative of the message type using a destination identifier, a source identifier, or combination thereof, wherein the source identifier includes a first portion that is in sidelink control information and a second portion that is in a medium access control subheader; and transmitting the message in accordance with the indicated message type.

28. A method for wireless communication at a receiving device, comprising:

receiving control information, from a transmitting device of an aerial vehicle, that indicates a message type of a message, wherein the message type indicated by the control information is one of a plurality of aerial vehicle broadcast message types and the control information is indicative of the message type using a destination identifier, a source identifier, or combination thereof, wherein the source identifier includes a first portion that is in sidelink control information and a second portion that is in a medium access control subheader; and receiving the message in accordance with the indicated message type.

\* \* \* \* \*